(12) United States Patent
Fujii et al.

(10) Patent No.: US 8,514,688 B2
(45) Date of Patent: Aug. 20, 2013

(54) COMMUNICATION SYSTEM, COMMUNICATION APPARATUS, AND COMMUNICATION METHOD

(75) Inventors: Kunihide Fujii, Tokyo (JP); Tadashi Morita, Tokyo (JP); Shigeru Arisawa, Tokyo (JP); Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1309 days.

(21) Appl. No.: 10/538,659

(22) PCT Filed: Dec. 8, 2003

(86) PCT No.: PCT/JP03/15646
§ 371 (c)(1),
(2), (4) Date: May 3, 2006

(87) PCT Pub. No.: WO2004/056006
PCT Pub. Date: Jul. 1, 2004

(65) Prior Publication Data
US 2006/0245402 A1  Nov. 2, 2006

(30) Foreign Application Priority Data
Dec. 17, 2002  (JP) .................... 2002-364747

(51) Int. Cl.
*H04J 9/00* (2006.01)
*H04L 12/413* (2006.01)

(52) U.S. Cl.
USPC .......... 370/204; 370/232; 370/284; 370/329; 370/339; 370/445

(58) Field of Classification Search
None
See application file for complete search history.

(56) References Cited

U.S. PATENT DOCUMENTS

| | | | | |
|---|---|---|---|---|
| 5,722,059 A | * | 2/1998 | Campana, Jr. | 455/226.2 |
| 6,005,885 A | * | 12/1999 | Warren et al. | 375/152 |
| 6,034,603 A | * | 3/2000 | Steeves | 340/10.2 |
| 6,067,291 A | * | 5/2000 | Kamerman et al. | 370/338 |

(Continued)

FOREIGN PATENT DOCUMENTS

| | | |
|---|---|---|
| EP | 513507 A1 * | 11/1992 |
| EP | 0 579 372 A2 | 1/1994 |

(Continued)

OTHER PUBLICATIONS

Supplementary Search Report issued Jun. 20, 2011 in Europe Application No. 03777332.2.

*Primary Examiner* — John Blanton
(74) *Attorney, Agent, or Firm* — Oblon, Spivak, McClelland, Maier & Neustadt, L.L.P.

(57) ABSTRACT

An RF (radio frequency) signal is generated at a first communication device and is modulated. A second RF signal provided to the first communication device from the second communication device is demodulated. The second RF signal is detected. The generating is actuated to initiate an active or a passive mode communication, when the detecting does not detect the second RF signal at a level of a first threshold or more, the active mode including a transmission of modulated data at the first communication device and the second communication device, the passive mode providing load modulated communication from the second communication device to the first communication device. When the first communication device receives an indication to start a communication of the active mode from the second communication device, the demodulating receives data at a level of a second threshold or higher, the second threshold being higher than the first threshold.

7 Claims, 30 Drawing Sheets

(56) References Cited

U.S. PATENT DOCUMENTS

| | | | |
|---|---|---|---|
| 6,127,979 A * | 10/2000 | Zhou et al. | 343/702 |
| 6,282,407 B1 * | 8/2001 | Vega et al. | 455/41.1 |
| 6,393,032 B1 * | 5/2002 | Ikegami | 370/447 |
| 6,998,985 B2 * | 2/2006 | Reisman et al. | 340/573.1 |
| 2001/0000959 A1 * | 5/2001 | Campana, Jr. | 340/573.1 |
| 2001/0028639 A1 | 10/2001 | Eikelenboom et al. | |
| 2003/0125065 A1 * | 7/2003 | Barak et al. | 455/522 |
| 2003/0169152 A1 * | 9/2003 | Charrat et al. | 340/10.1 |

FOREIGN PATENT DOCUMENTS

| | | |
|---|---|---|
| EP | 0 903 891 A1 | 3/1999 |
| JP | 11-17687 | 1/1999 |
| JP | 11-163897 | 6/1999 |
| JP | 2003-307840 | 10/2003 |
| JP | 2005-42852 | 2/2005 |
| JP | 2005-57381 | 3/2005 |
| JP | 2005-57382 | 3/2005 |
| JP | 2005-57383 | 3/2005 |

* cited by examiner

FIG. 12

| COMMAND/RESPONSE |
|---|
| ATR_REQ |
| ATR_RES |
| WUP_REQ |
| WUP_RES |
| PSL_REQ |
| PSL_RES |
| DEP_REQ |
| DEP_RES |
| DSL_REQ |
| DSL_RES |
| RLS_REQ |
| RLS_RES |

COMMUNICATION SYSTEM, COMMUNICATION APPARATUS, AND COMMUNICATION METHOD

TECHNICAL FIELD

The present invention relates to a communication system, a communication device, and a communication method, and more particularly to, a communication system, a communication device, and a communication method for easily solving a problem of a so-called hidden terminal that is caused in the wireless communication such as near field communication.

BACKGROUND ART

As a near-field communication system, e.g., an IC (Integrated Circuit) system is widely known. In the IC card system, a reader/writer generates an electromagnetic wave, thereby generating a so-called RF (Radio Frequency) filed (magnetic field). An IC card is close to the reader/writer, then, the power is supplied to the IC card received by electromagnetic induction, and data is transferred between the reader and the writer.

The current specification of the IC card system includes a type A, a type B, and a type C.

The type A is used by Royal Philips Electronics as an MIFARE system. In the type A, data is encoded by Miller in the data transfer from the reader/writer to the IC card, and data is encoded by Manchester in the data transfer from the IC card to the reader and the writer. Further, the type A uses, as a data transfer rate, 106 kbps (kilo bit per second).

In the type B, data is encoded by NRZ in the data transfer from the reader/writer to the IC card, and the data is encoded by NRZ-L in the data transfer from the IC card to the reader/writer. Further, the type B uses, as a data transfer rate, 106 kbps.

The type C is used as a FeliCa system of Sony Corporation serving as the present applicant. Data is encoded by Manchester in the data transfer between the reader and the writer and the IC card. Further, the type C ouses, as a data transfer rate, 212 kbps.

In the wireless communication such as near field communication, the problem of the so-called hidden terminal might be caused and therefore it is important to solve the problem.

For example, in a conventional wireless LAN (Local Area Network) system, generally, commands RTS (Request to send) and CTS (Clear to send) are received and sent in the data communication, thereby solving the problem of the hidden terminal (e.g., in non-patent document ANSI/IEEE Std 802.11, 1999 Edition, LOCAL AND METROPOLITAN AREA NETWORKS: WIRELESS LAN, Chapter 9 MAC sublayer functional description).

Here, the problem of the hidden terminal has the following problems.

That is, in the wireless communication, one of a plurality of communication devices sends data to another and then it is controlled that both the communication devices simultaneously do not output the electric wave (electromagnetic wave). Specifically, the communication device for outputting the electric wave detects the peripheral electric wave. In the case of detecting the peripheral electric wave, the communication device for outputting the electric wave does not output the electric wave. In the case of detecting no electric wave, the communication device for outputting the electric wave outputs the electromagnetic wave. Thus, the electric wave is alternately outputted between the one communication device and the other communication device for receiving and sending data.

When the communication device for outputting the electric wave controls the output of electric wave depending on the presence or absence of peripheral electromagnetic wave as mentioned above, one communication device might simultaneously send data to other communication devices and then the one communication device cannot receive the data.

That is, it is assumed that three communication devices A, B, and C exist. Then, the distance between the communication devices A and B is to control the exclusive use of electric wave therebetween. Further, the distance between the communication devices B and C is to control the exclusive use of electric wave therebetween. However, the distance between the communication devices A and C is not to control the exclusive use of electric wave therebetween.

In this case, the communication device B does not output the electric wave when any of the communication device A and the communication device C outputs the electric wave. However, the communication device A outputs the electric wave when the communication device C outputs the electric wave. Further, the communication device C outputs the electric wave when the communication device A outputs the electric wave.

When the communication devices A to C have the above-mentioned relationships, both the communication devices A and C might simultaneously send the electric wave (data) to the communication device B. For example, the distance between the communication devices B and A is equal to the distance between the communication devices B and C and both the communication devices A and C output the electric wave with the same strength, then, and the communication device B receives the individual electric waves outputted from the communication devices A and C with the same strength. Consequently, the crosstalk does not enable the normal reception of the data from both communication devices A and C.

As mentioned above, the communication device B does not normally receive the data because the communication device A confirms the existence of the communication device B and, however, does not confirm the existence of the communication device C, and the communication device C further confirms the existence of the communication device B and, however, does not confirm the existence of the communication device A. As mentioned above, the problem of the hidden terminal is that both the communication devices A and C are hidden from each other and are not viewed from each other and therefore the crosstalk is caused in the communication device B by simultaneously outputting the electric waves from both the communication devices A and C.

Then, in the conventional wireless LAN, the communication device on the communication source for starting the communication sends the command RTS for informing a communication time (time for sharing the space) to the communication device serving as the communication partner. The communication device, serving as the communication partner, for receiving the command RTS returns the command CTS for informing the acceptance for the command RTS and the communication time (time for sharing the space) to the communication device on the communication source. Other communication devices having the distance for receiving the command RTS or CTS from the communication device on the communication source or as the communication partner recognize the space sharing in one time for sharing the space in accordance with the command RTS or CTS, and do not send the electric wave (data) in the time for sharing the space.

In the communication devices A to C having the above-mentioned positional relationships, the communication device A sends the command RTS to the communication device B, and the communication device B sends the command CTS, serving as a response for the command RTS, to the communication device A. The communication device C can receive the command CTS sent by the communication device B and the communication device C receives the command CTS sent by the communication device B and then does not send the electric wave. Consequently, the communication device B prevents the collision of electric waves (data) from the communication devices A and C.

However, according to the solving method of the problem of the hidden terminal by using the commands RTS and CTS, the communication device needs control logic and memory therefore and thus costs are increased.

DISCLOSURE OF INVENTION

The present invention is devised in consideration of the above-mentioned situation to solve the problem of the hidden terminal.

According to the present invention, in a communication system, when detecting means does not detect the electromagnetic wave at the level of a first threshold or more, a first communication device starts to output an electromagnetic wave and a second communication device requires the electromagnetic wave at the level of a second threshold or more higher than the first threshold so as to obtain data by demodulating means.

According to the present invention, when the detecting means does not detect the electromagnetic wave at the level of the first threshold or more, the first communication device starts to output the electromagnetic wave, and the electromagnetic wave communicates with another device at the position where it reaches at the level of the second threshold or more higher than the first threshold.

According to the present invention, in a first communication method, when a detecting step does not detect the electromagnetic wave at the level of the first threshold or more, an output of the electromagnetic wave starts and the electromagnetic wave communicates with the other device at the position where it reaches at the level of the second threshold or more higher than the first threshold.

According to the present invention, the second communication device requires the electromagnetic wave at the level of the second threshold or more higher than the first threshold so as to obtain data by demodulating means when the other device checks that the electromagnetic wave at the level of the first threshold or more does not exist and the output of the electromagnetic wave starts.

According to the present invention, a second communication method needs the electromagnetic wave at the level of the second threshold or more higher than the first threshold so as to obtain data by demodulating means when the other device checks that the electromagnetic wave at the level of the first threshold or more does not exist and the output of the electromagnetic wave starts.

According to the present invention, in the communication system, when the electromagnetic wave at the level of the first threshold or more is not detected, the first communication device starts to output the electromagnetic wave and the second communication device needs the electromagnetic wave at the level of the second threshold or more higher than the first threshold so as to obtain the data.

According to the present invention, in the first communication device and communication method, when the electromagnetic wave at the level of the first threshold or more is not detected, the output of the electromagnetic wave starts and the electromagnetic wave is communicated with the other device at the position where it reaches at the level of the second threshold or more higher than the first threshold.

According to the present invention, in the second communication device and communication method, when the other device checks that the electromagnetic wave at the level of the first threshold or more does not exist and the output of the electromagnetic wave starts, the data acquisition needs the electromagnetic wave at the level of the second threshold or more higher than the first threshold.

BRIEF DESCRIPTION OF THE DRAWINGS

FIG. 12 is a diagram showing a list of commands and responses.

BEST MODE FOR CARRYING OUT THE INVENTION

Figure 1:
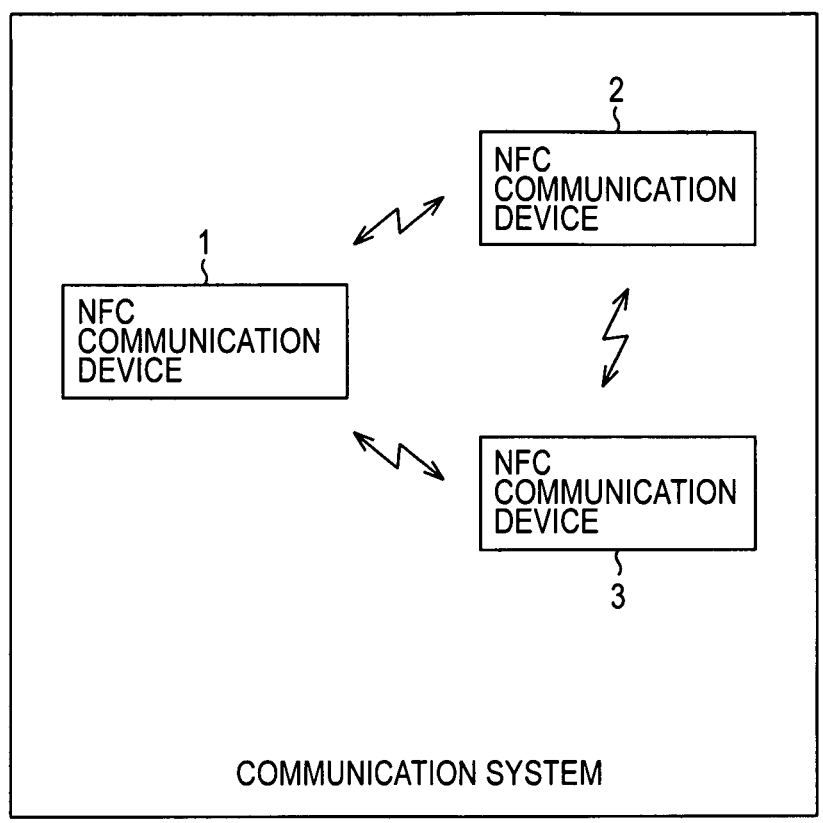
FIG. 1 is a diagram showing an example of the structure of a communication system according to a first embodiment.

FIG. 1 shows an example of the structure a communication system (here, system is formed by logically combining a plurality of devices, irrespective of whether or not the devices are arranged in the same casing) according to an embodiment.

Referring to FIG. 1, the communication system comprises three NFC communication devices 1, 2, and 3. The NFC communication devices 1 to 3 perform NFC (Near Field Communication) by electromagnetic induction between one NFC communication device and another with carriers having a single frequency.

The NFC communication devices 1 to 3 use a carrier frequency of, e.g., 13.56 MHz of ISM (Industrial Scientific Medical) band.

The near field communication means the communication that is established within the distance between the devices for communication of several tens cm, including the communication of the contact devices (casings) for communication.

The communication system shown in FIG. 1 may be an IC card system, in which at least one of the NFC communication devices 1 to 3 is used as a reader/writer and further another NFC communication device is used as an IC card. In addition, each of the NFC communication devices 1 to 3 may be a communication system of a PDA (Personal Digital Assistant), a PC (Personal Computer), a mobile phone, a watch, or a pen. That is, the NFC communication devices 1 to 3 are devices for Near-Field Communication, and are not limited to the IC card in the IC card system or the reader/writer.

The NFC communication devices 1 to 3 have two features. First, the NFC communication devices 1 to 3 can communicate data with each other in two communication modes. Secondarily, the NFC communication devices 1 to 3 can transfer data at a plurality of transfer rates.

The two communication modes are a passive mode and an active mode. Now, the communication between the NFC communication devices 1 and 2 is focused from the NFC communication devices 1 to 3. Then, in the passive mode, similarly to the above-mentioned conventional IC card system, one of the NFC communication devices 1 and 2, e.g., the NFC communication device 1 modulates (the carrier corresponding to) the electromagnetic wave generated by the NFC communication device 1, thereby sending the data to the NFC communication device 2 serving as the other NFC communication device 2. The NFC communication device 2 modulates the load of (the carrier corresponding to) the electromagnetic wave generated by the NFC communication device 1, thereby sending the data to the NFC communication device 1.

On the other hand, in the active mode, both the NFC communication devices 1 and 2 modulate (the carrier corresponding to) the electromagnetic waves generated by the NFC communication devices 1 and 2, thereby sending the data.

In the case of near field communication with the electromagnetic induction, an initiator denotes the device which first outputs the electromagnetic wave to start the communication and, that is, has the initiative for communication. In the near field communication, the initiator sends a command to the communication partner and the communication partner returns a response for the command. A target denotes the communication partner that sends a response to the command from the initiator.

For example, the NFC communication device 1 starts to output the electromagnetic wave to start the communication with the NFC communication device 2. Then, referring to FIGS. 2 and 3, NFC communication device 1 is the initiator, and the NFC communication device 2 is the target.

Figure 2:
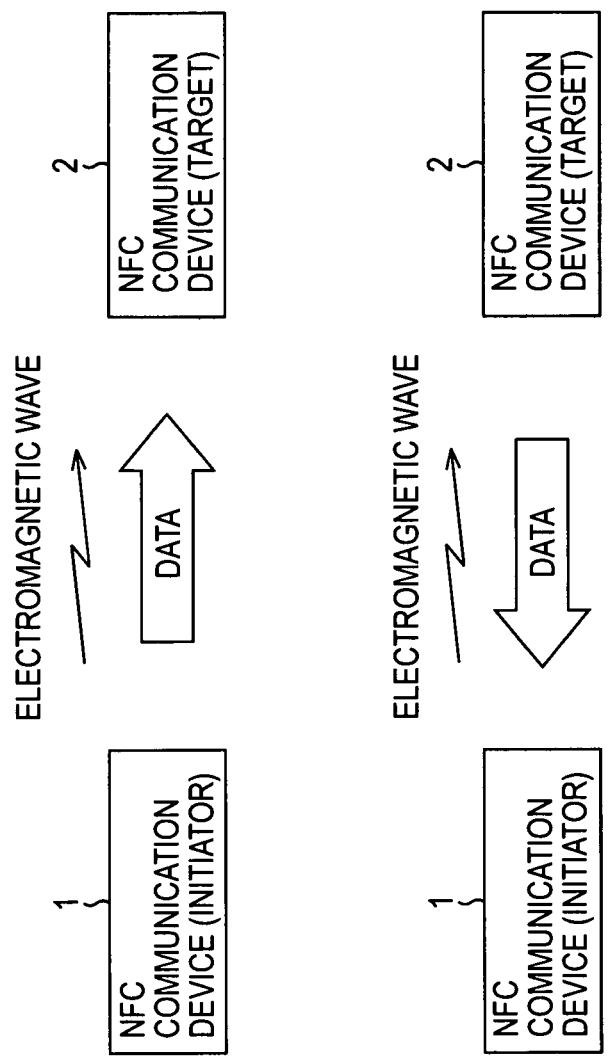
FIG. 2 is an explanatory diagram of a passive mode.

In the passive mode, referring to FIG. 2, the NFC communication device 1 continuously outputs the electromagnetic wave. The NFC communication device 1 modulates the electromagnetic wave outputted by the NFC communication device 1, thereby sending the data to the NFC communication device 2 serving as the target. The NFC communication device 2 modulates the load of the electromagnetic wave outputted by the NFC communication device 1 serving as the initiator, thereby sending the data to the NFC communication device 1.

Figure 3:
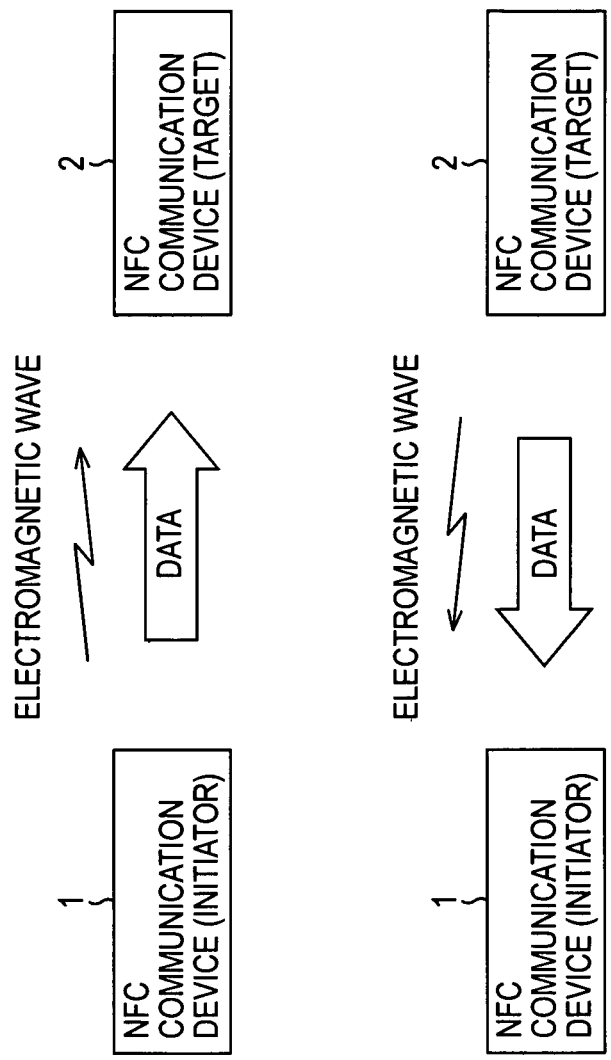
FIG. 3 is an explanatory diagram of an active mode.

In the active mode, referring to FIG. 3, the NFC communication device 1 serving as the initiator starts to output the electromagnetic wave by itself in the case of sending the data by itself, modulates the electromagnetic wave, thereby sending the data to the NFC communication device 2 serving as the target. The NFC communication device 1 stops the output of the electromagnetic wave after ending to send the data. The NFC communication device 2 serving as the target starts to output of the electromagnetic wave by itself in the case of sending the data by itself, and modulates the electromagnetic wave, thereby sending the data to the NFC communication device 2 serving as the target. The NFC communication device 2 stops the output of the electromagnetic wave after ending to send the data.

The second feature that the NFC communication devices 1 to 3 can transfer the by the plurality of transfer rates will be described later.

Referring to FIG. 1, the three NFC communication devices 1 to 3 form the communication system. The number of the NFC communication devices forming the communication system is not limited to three and may be two or four or more. Further, the communication system may include not only the NFC communication device but also an IC card or a reader/writer forming the conventional IC card system.

Figure 4:
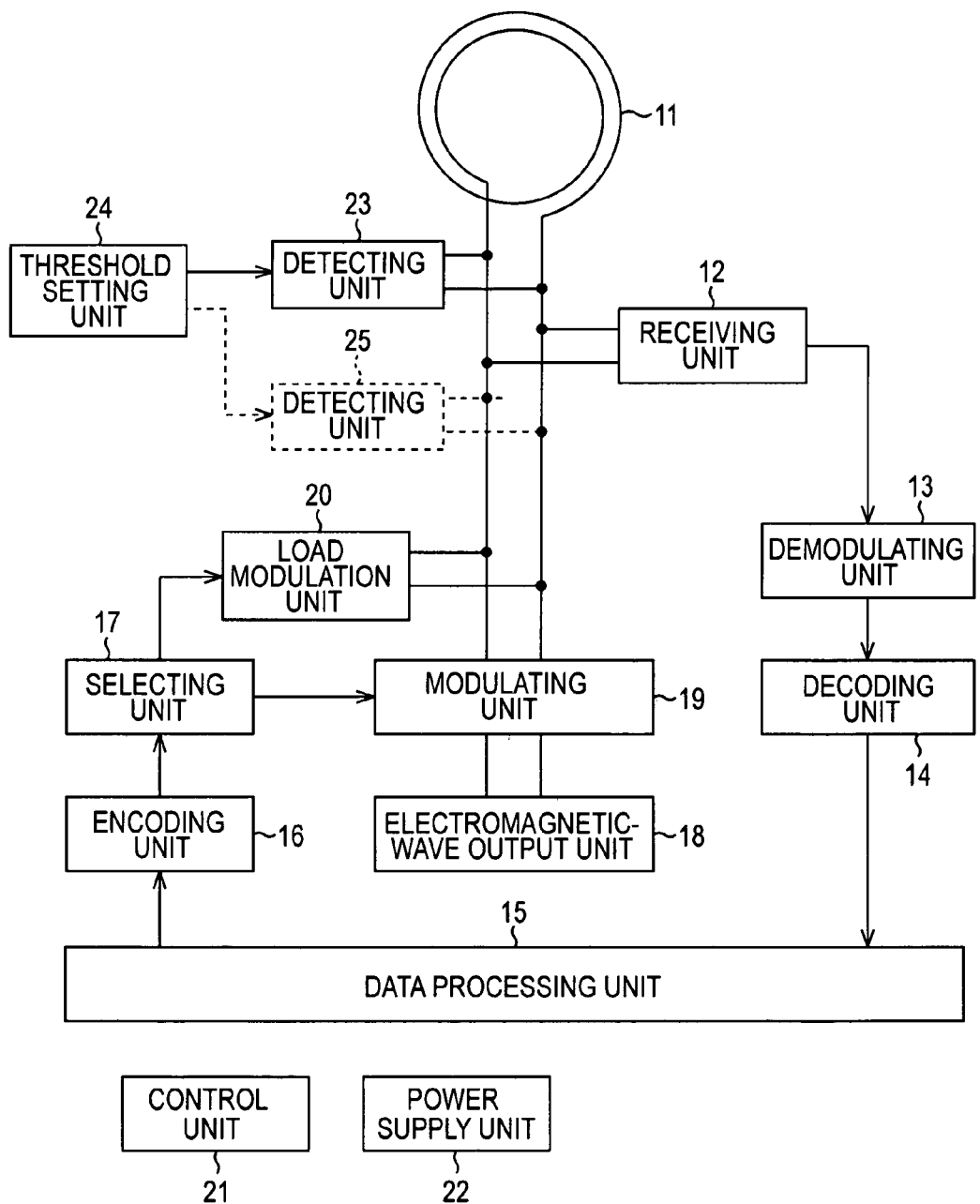
FIG. 4 is a block diagram showing an example of the structure of an NFC communication device 1.

FIG. 4 shows an example of the structure of the NFC communication device 1 shown in FIG. 1. The remaining NFC communication devices 2 and 3 shown in FIG. 1 is similar to the NFC communication device 1 shown in FIG. 4 and therefore a description is omitted.

An antenna 11 forms a loop coil. The current flowing to the coil changes and the antenna 11 outputs the electromagnetic wave. The magnetic flux passing through the coil serving as the antenna 11 changes, thereby flowing the current to the antenna 11.

The receiving unit 12 receives the current flowing to the antenna 11, tunes and detects the signal, and outputs the signal to a demodulating unit 13. The demodulating unit 13 demodulates the signal supplied from the receiving unit 12, and supplies the demodulated signal to the decoding unit 14. The decoding unit 14 decodes Manchester code supplied from the demodulating unit 13, and supplies data as a decoding result to the data processing unit 15.

The data processing unit 15 performs predetermined processing based on the data supplied from the decoding unit 14. Further, the data processing unit 15 supplies, to an encoding unit 16, the data to be sent to another device.

The encoding unit 16 encodes the data supplied from the data processing unit 15 to e.g., Manchester code, and supplies the encoding data to a selecting unit 17. The selecting unit 17 selects one of a modulating unit 19 and a load modulation unit 20, and outputs the signal supplied from the encoding unit 16 to the selected unit.

The selecting unit 17 selects a modulating unit.19 or a load modulation unit 20 under the control of a control unit 21. When the communication mode is the passive mode and the NFC communication device 1 is the target, the control unit 21 allows the selecting unit 17 to select the load modulation unit 20. When the communication mode is the active mode or when the communication mode is the passive mode and the NFC communication device 1 is the initiator, the control unit 21 allows the selecting unit 17 to select a modulating unit 19. In the case in which the communication mode is the passive mode and the NFC communication device 1 is the target, the signal outputted by the encoding unit 16 is supplied, via the selecting unit 17, to the load modulation unit 20. In another case, the signal outputted by the encoding unit 16 is supplied, via the selecting unit 17, to the modulating unit 19.

The electromagnetic-wave output unit 18 flows, from the antenna 11 to the antenna 11, the current for irradiating (the electromagnetic wave) of the carrier with the predetermined single frequency. The modulating unit 19 modulates the carrier, serving as the current flowed to the antenna 11 by the electromagnetic-wave output unit 18 in accordance with the signal supplied from the selecting unit 17. Thus, antenna 11 irradiates the electromagnetic wave obtained by modulating the carrier in accordance with the data outputted to the encoding unit 16 by the processing unit 15.

The load modulation unit 20 changes the impedance in the case of externally viewing in accordance with the signal supplied from the selecting unit 17. When another device outputs the electromagnetic wave as the carrier and thus the RF field (magnetic filed) is generated around the antenna 11, the impedance changes in the case of externally viewing the coil as the antenna 11, thereby changing the RF field around the antenna 11. Consequently, the carrier serving as the electromagnetic wave outputted by the other device is modulated in accordance with the signal supplied from the selecting unit 17. The data outputted from the data processing unit 15 to the encoding unit 16 is sent to the other device that outputs the electromagnetic wave.

The modulating system of the modulating unit 19 and the load modulation unit 20 is e.g., ASK (Amplitude Shift Keying). However, the modulating system of the modulating unit 19 and the load modulation unit 20 is not limited to ASK, and may use other modulating systems such as PSK (Phase Shift Keying) and QAM (Quadrature Amplitude Modulation). Further, the degree of modulation is not limited to 8%, 30%, 50%, and 100% and may preferably be selected.

The control unit 21 controls the blocks forming the NFC communication device 1. The power supply unit 22 supplies necessary power to the blocks forming the NFC communication device 1. Referring to FIG. 4, the drawing for controlling the blocks forming the NFC communication device 1 by the control unit 21 and the drawing for supplying the power to the blocks forming the NFC communication device 1 by the power supply unit 22 are complicated and therefore they are omitted.

Similarly to the receiving unit 12, the detecting unit 23 receives the current flowing into the antenna 11, and detects based on the current whether or not the antenna 11 receives the electromagnetic wave at a predetermined threshold level (density of magnetic flux) supplied from the threshold setting unit, 24.

The threshold setting unit 24 sets a threshold of the electromagnetic level detected by the detecting unit 23, and the set threshold to the detecting unit 23. The threshold setting unit 24 sets two thresholds (magnetic-flux density TH1 for determining the suppression of output of a carrier and a magnetic-flux density TH2 of a carrier at operating limit, which will be described later). The detecting unit 23 detects the electromagnetic waves at a threshold level by the threshold setting unit 24 or more from the two sets thresholds. As shown by a dotted line in FIG. 4, the NFC communication device 1 has the detecting unit 25 in addition to the detecting unit 23. The detecting unit 23 detects the electromagnetic wave having one of the two thresholds or more. The detecting unit 25 detects the electromagnetic wave having the other threshold or more.

In this case, the decoding unit 14 and the encoding unit 16 process the Manchester code of the type C. The decoding unit 14 and the encoding unit 16 selects one of a plurality of types including modified-mirror mode in the type A or NZR in the type C in addition to the Manchester code, and processes the selected code.

Figure 5:
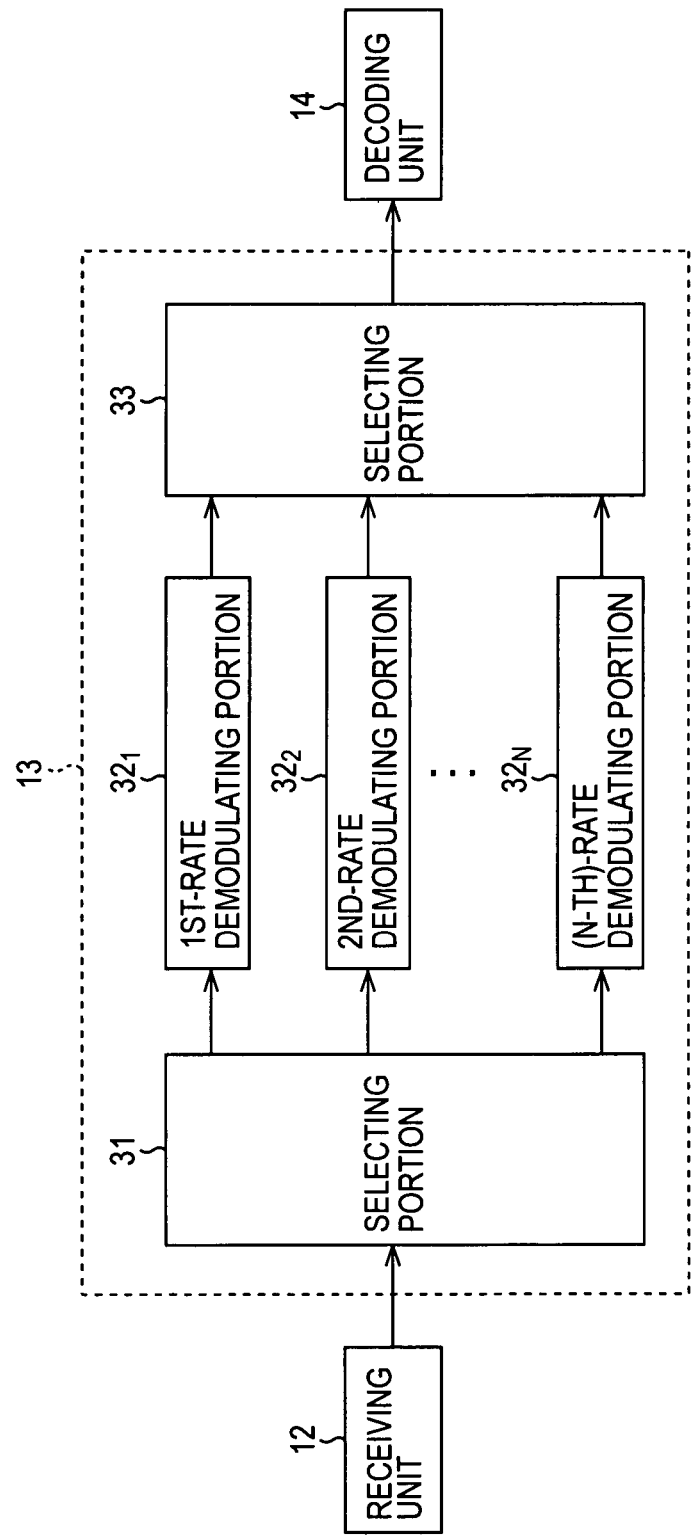
FIG. 5 is a block diagram showing one example of a demodulating unit 13.

FIG. 5 shows an example of the structure of the demodulating unit 13 shown in FIG. 4.

Referring to FIG. 5, the demodulating unit 13 demodulates a selecting portion 31, N ($\geq 2$) demodulating portions $32_1$ to $32_N$, and a selecting portion 33.

Under the control-operation of the control unit 21 (shown in FIG. 4), the selecting portion 31 selects one of the demodulating portions $32_n$ (n=1, 2, . . . , N) from N demodulating portions $32_1$ to $32_N$, and supplies a signal outputted by the receiving unit 12 to the selected demodulating portion $32_n$.

The demodulating portion $32_n$ demodulates the signal sent by an n-th transfer rate, and supplies the demodulated signal to the selecting portion 33. The demodulating portion $32_n$ and the demodulating portion $32_{n'}$ (n≠n') demodulate the signals sent by different transfer rates. Therefore, the demodulating unit 13 shown in FIG. 5 demodulates the signals sent by N (first to N-th) transfer rates. The N transfer rates include fast 424 kbps and 848 kbps, in addition to the above-mentioned 106 kbps and 212 kbps. That is, the N transfer rates includes, e.g., the existing transfer rates in the near field communication of the existing IC card system and the like.

Under the control operation of the control unit 21, the selecting portion 33 selects one demodulating portion $32_n$ Of the N demodulating portions $32_1$ to $32_N$, and supplies the demodulated output obtained by the demodulating portion $32_n$ to the decoding unit 14.

With the demodulating unit 13 having the above structure, the control unit 21 (shown in FIG. 4) allows the selecting portion 31 to sequentially select N demodulating portions $32_1 \circ 32_N$. Thus, the demodulating portions $32_1$ to $32_N$ demodulate the signals supplied via the selecting portion 31 from the receiving unit 12. The control unit 21 recognizes the demodulating portion $32_n$ that normally demodulates the signal supplied via the selecting portion 31 from the receiving unit 12, and controls the selecting portion 33 so as to select the output of the demodulating portion $32_n$. Under the control operation of the control unit 21, the selecting portion 33 selects the demodulating portion $32_n$. Thus, the output that is normally demodulated by the demodulating portion $32_n$ is supplied to the decoding unit 14.

The demodulating unit 13 demodulates the signal sent by an arbitrary transfer rate of the N transfer rates.

Only in the case of normal demodulation, the demodulating portions $32_1$ to $32_N$ output a demodulating result. In the abnormal demodulation, no data (e.g., high impedance) is outputted. In this case, the selecting portion 33 may sets the OR operation of all outputs of the demodulating portions $32_1$ to $32_N$ and may output the OR operation to the decoding unit 14.

Figure 6:
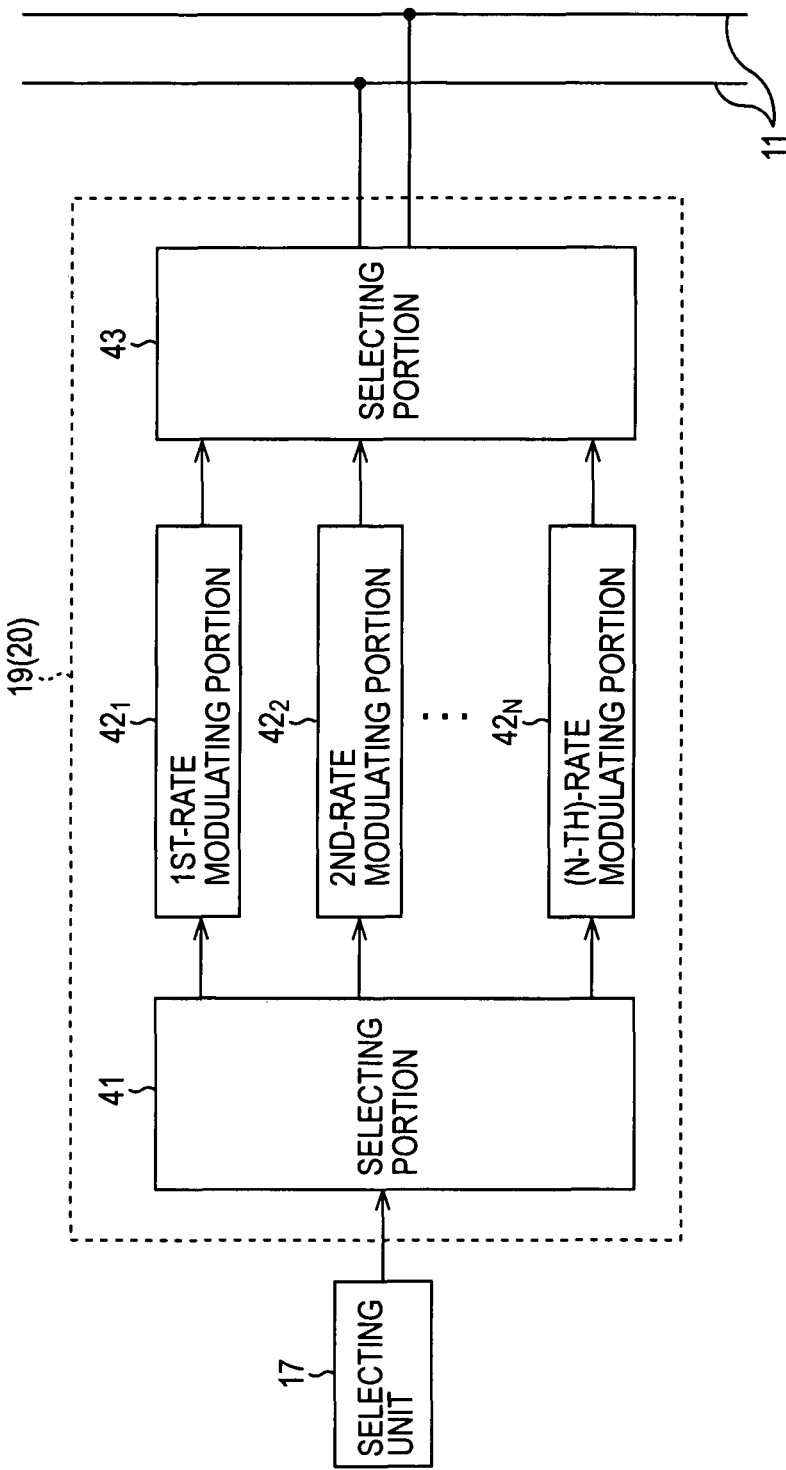
FIG. 6 is a block diagram showing one example of a modulating unit 19.

FIG. 6 shows an example of the structure of the modulating unit 19 shown in FIG. 4.

Referring to FIG. 6, the modulating unit 19 comprises a selecting portion 41, N ($\geq 2$) modulating portions $42_1$ to $42_N$, and a selecting portion 43.

Under the control operation of the control unit 21 (FIG. 4), the selecting portion 41 selects one modulating portion $42_n$ (n=1, 2, ..., N) from N modulating portions $42_1$ to $42_N$, and supplies the signal outputted by the selecting unit 17 (FIG. 4) to the selected modulating portion $42_n$.

The modulating portion $42_n$ modulates the carrier as the current flowing into the antenna 11 via the selecting portion 43 in accordance with the signal supplied from the selecting portion 41 so as to send the data by the n-th transfer rate. The modulating portion $42_n$ and the modulating portion $42_{n'}$ (n≠n') modulate the carrier by different transfer rates. Referring to FIG. 6, the modulating unit 19 sends the data by N (first to N-th) transfer rates. The N transfer rates may be the same transfer rate as that of the demodulation of the demodulating unit 13 shown in FIG. 5.

Under the control operation of the control unit 21, the selecting portion 43 selects the same modulating portion $42_n$ as that selected by the selecting portion 41 from the N modulating portions $42_1$ to $42_N$, and electrically connects the modulating portion $42_n$ and the antenna 11.

For the modulating unit 19 with the above structure, the control unit 21 (shown in FIG. 4) allows the selecting portion 41 to sequentially select N modulating portions $42_1$ to $42_N$. Thus, the control 21 further allows the modulating portions $42_1$ to $42_N$ to modulate the carrier as the current flowing into the antenna 11 via the selecting portion 43 in accordance with the signal supplied from the selecting portion 41.

The modulating unit 19 modulates the carrier and sends the data so as to send the data by an arbitrary transfer rate of the N transfer rates.

The load modulation unit 20 shown in FIG. 4 has the same structure as that of the modulating unit 19 shown in FIG. 6 and therefore a description thereof is omitted.

As mentioned above, the NFC communication devices 1 to 3 modulate the carrier to the signal of the data sent by any of the N transfer rates, and further demodulate the signal of the data sent by any of the N transfer rates. The N transfer rate the transfer rate that has already been used in the near field communication of the existing IC card system (FeliCa system) and another transfer rate. Among the NFC communication devices 1 to 3, the data is received/sent by any of the N transfer rates. Further, among the NFC communication devices 1 to 3, the data is received/sent between the IC card and the reader/writer forming the existing IC card system by the transfer rate used by the IC card and the reader/writer.

As a consequence, the NFC communication devices 1 to 3 are easily applied to services using the existing near field communication without user's confusion. Further, the NFC communication devices 1 to 3 are easily applied to services using the near field communication with the fast data rate which will be put into the market in the future together with the existing the hear field communication.

Among the NFC communication devices 1 to 3, the data is directly received/sent, not via another device such as a reader/writer because the data is transferred both in the passive mode in the conventional near field communication and in the active mode for sending the data by outputting the electromagnetic wave by itself.

Figure 7:
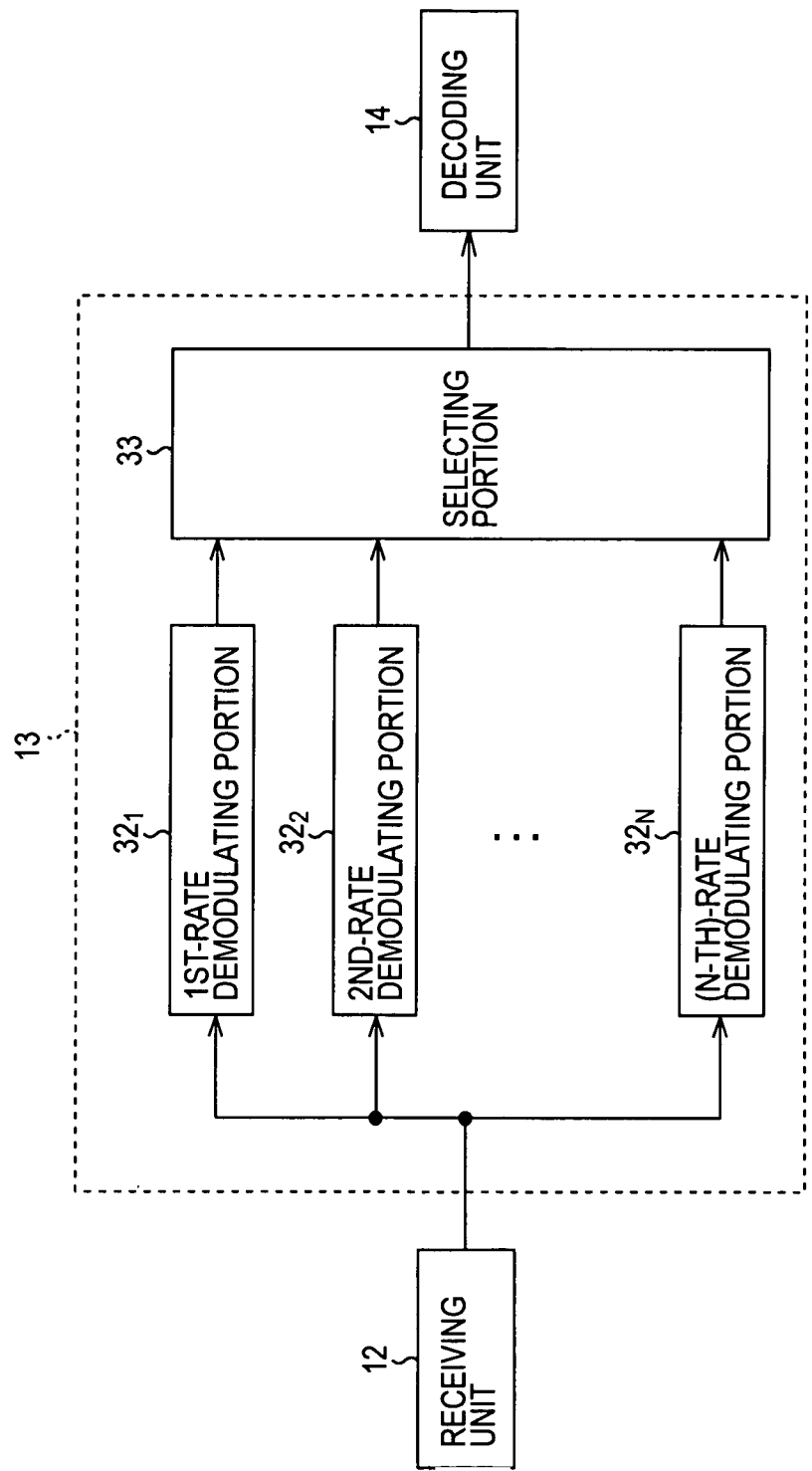
FIG. 7 is a block diagram showing another example of the demodulating unit 13.

FIG. 7 shows another example of the demodulating unit 13 shown in FIG. 4. The same reference numerals denote the corresponding portions in FIG. 5 and a description thereof is properly omitted. That is, basically, the demodulating unit 13 shown in FIG. 7 has the same structure as that FIG. 5, except for the selecting portion 31.

According to the embodiment, referring to FIG. 7, the signal outputted by the receiving unit 12 is simultaneously supplied to the demodulating portions $32_1$ to $32_N$. The demodulating portions $32_1$ to $32_N$ simultaneously demodulate the signal from the receiving unit 12. The control unit 21 recognizes the demodulating portion $32_n$ which normally demodulates the signal from the receiving unit 12, and controls the selecting portion 33 to output the signal from the demodulating portion $32_n$. Under the control operation of the control unit 21, the selecting portion 33 selects the demodulating portion $32_n$, thereby supplying the output normally demodulating the demodulating portion $32_n$ to the decoding unit 14.

Incidentally, according to the embodiment, referring to FIG. 7, the demodulating portions $32_1$ to $32_N$ must always demodulate the signal. On the contrary, according to the embodiment, referring to FIG. 5, only demodulating devices of the demodulating portions $32_1$ to $32_N$ that are selected by the selecting portion 31 demodulates the signal and another operation stops. In view of saving the power consumption of device, the structure shown in FIG. 5 is more advantageous than that shown in FIG. 7. On the other hand, in view of early obtaining the normal demodulated output, the structure shown in FIG. 7 is more advantageous than that shown in FIG. 5.

Figure 8:
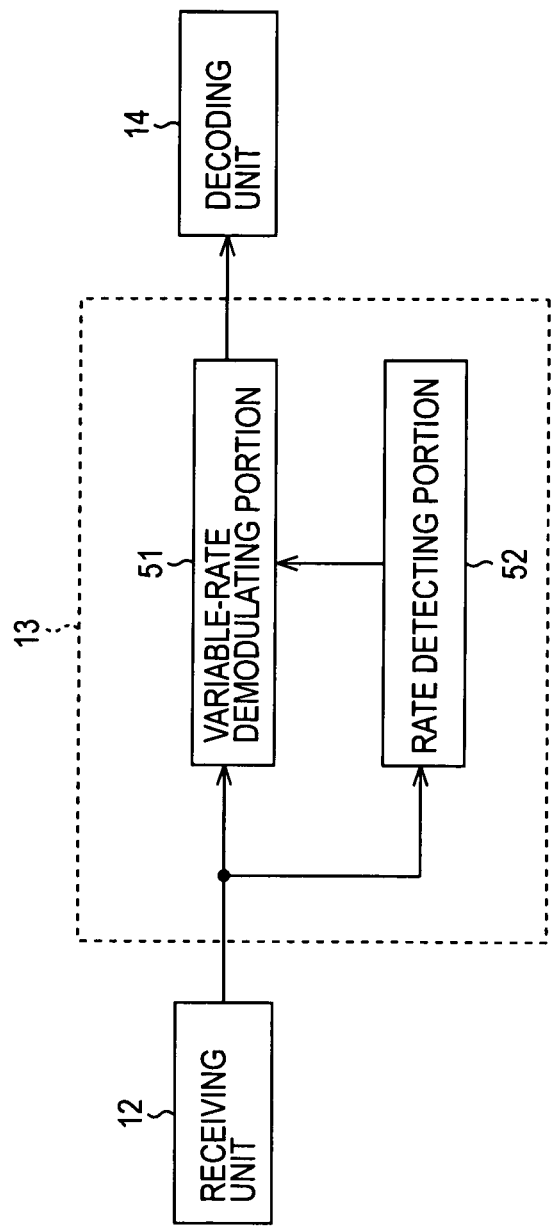
FIG. 8 is a block diagram showing another example of the demodulating unit 13.

FIG. 8 shows another example of the structure of the demodulating unit 13 shown in FIG. 4.

Referring to FIG. 8, the demodulating unit 13 comprises a variable-rate demodulating portion 51 and a rate detecting portion 52.

The variable-rate demodulating portion 51 demodulates the signal supplied from the receiving unit 12 as a signal of the transfer rate in accordance with an instruction from the rate detecting portion 52, and supplies the demodulating result to the decoding unit 14. The rate detecting portion 52 detects the transfer rate of the signal supplied from the receiving unit 12 and sends an instruction for demodulating the signal of the transfer rate to the variable-rate demodulating portion 51.

The demodulating portion 51 with the above structure supplies the signal outputted by the receiving unit 12 to the variable-rate demodulating portion 51 and the rate detecting portion 52. The rate detecting portion 52 detects which one of the N (first to N-th) transfer rates is the transfer rate of the signal supplied from the receiving unit 12, and sends an instruction for demodulating the signal of the transfer rate to the variable-rate demodulating portion 51. The variable-rate demodulating portion 51 demodulates the signal supplied from the receiving unit 12 as the signal of the transfer rate in accordance with the instruction from the rate detecting portion 52, and supplies the demodulating result to the decoding unit 14.

Any of the NFC communication devices 1 to 3 can become the initiator that first outputs the electromagnetic wave and starts the communication. Further, in the active mode, when any of the NFC communication devices 1 to 3 becomes the initiator or the target, it outputs the electromagnetic wave by itself.

When the NFC communication devices 1 to 3 are close thereto and at least two of the NFC communication devices 1 to 3 simultaneously output the electromagnetic wave, the collision is caused and the communication is not performed.

The NFC communication devices 1 to 3 detect whether or not (the RF field of) the electromagnetic wave from another device exists. Only when the RF field of the electromagnetic wave from the other device does not exist, the output of electromagnetic wave starts to prevent the collision. As mentioned above, to prevent the collision, the processing for detecting whether or not the electromagnetic wave from another device exists and starting the output of electromagnetic wave is referred to as RFCA (RF Collision Avoidance) processing.

The RFCA processing includes two processing of initial RFCA processing that is first performed by the NFC communication device (at least one of the NFC communication device 1 to 3 in FIG. 1) serving as the initiator and response RFCA processing that is performed by the NFC communication device for starting the output of electromagnetic wave at each timing for starting the output of electromagnetic wave in the communication in the active mode. Both in the initial RFCA processing and the response RFCA processing, similarly, it is detected whether or not the electromagnetic wave from another device exists before starting the output of electromagnetic wave and the output of electromagnetic wave starts only when the electromagnetic wave from the other device does not exist. However, the time from the timing for detecting no existence of the electromagnetic wave from the other device to the timing for starting the output of the electromagnetic wave varies between the initial RFCA processing and the response RFCA processing.

First, the initial RFCA processing will be described with reference to FIG. 9.

Figure 9:
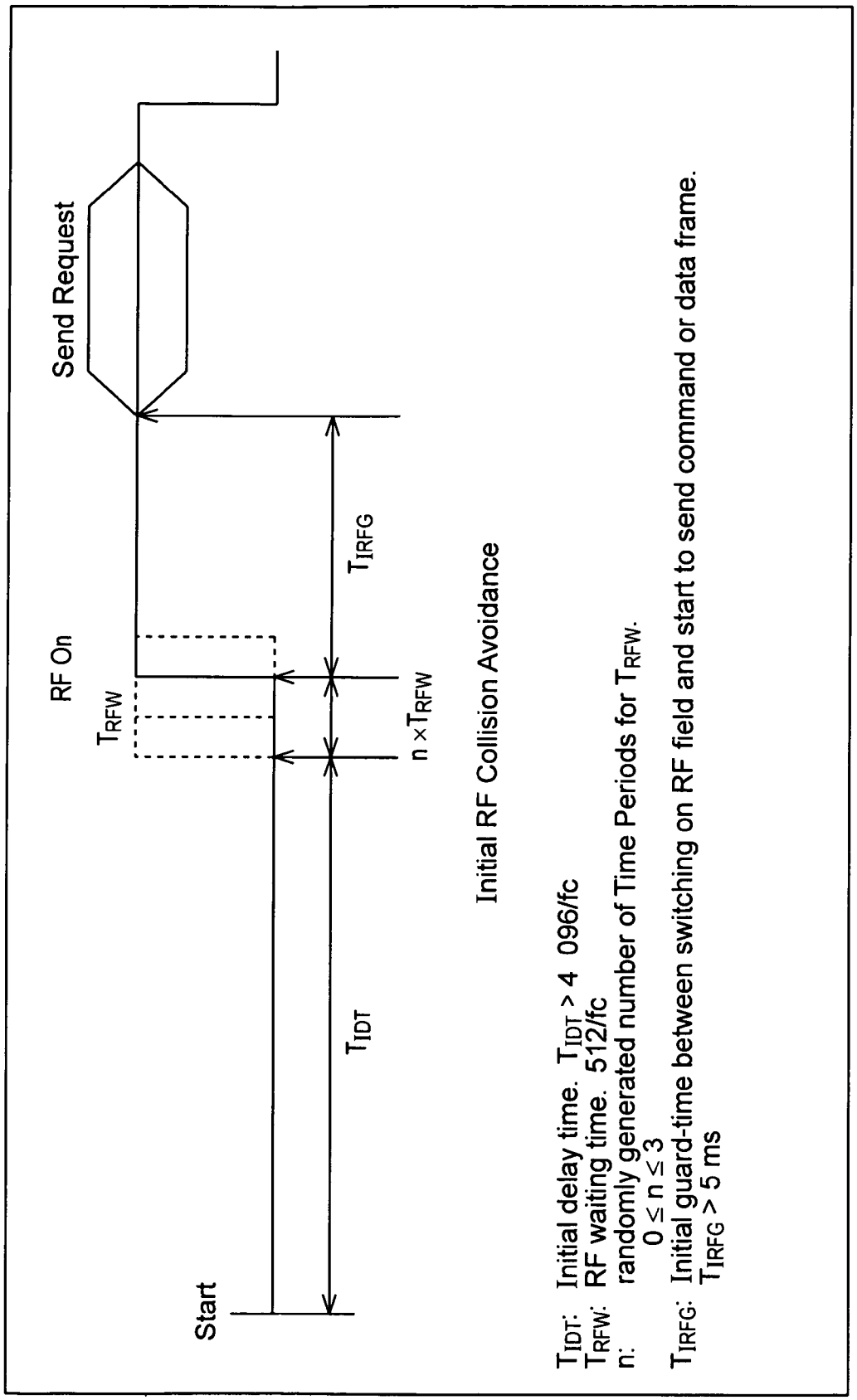
FIG. 9 is a timing chart for explaining initial RFCA processing.

FIG. 9 shows the electromagnetic wave that starts to be outputted by the initial RFCA. Referring to FIG. 9, (similarly, FIG. 10 which will be described later), the abscissa denotes the time and the ordinate denotes the level of the electromagnetic wave outputted by the NFC communication device.

The NFC communication device serving as the initiator continuously detects the electromagnetic wave from another device, starts the output of electromagnetic wave from the other device when the electromagnetic wave from the other device is not continuously detected for a time $(T_{IDT}+n \times T_{RFW})$, and starts Send Request of data (including a command) after the passage of only time $T_{IRFG}$ from the output timing.

Here, the time $T_{IDT}$ of the time $(T_{IDT}+n \times T_{RFW})$ is referred to as an initial delay time. A frequency of the carrier is designated by reference symbol $f_c$ and then the time $T_{IDT}$ as the initial delay time is larger than $4096/f_c$ and, for example, is an integer that is not less than 0 and not more than 3 and is generated by random numbers. The time TRFW is referred to as an RF waiting time and, for example, is $512/f_c$. The time TIRFG is referred to as an initial guard time and, for example, is larger than 5 ms.

By using a random number n for the time $(T_{IDT}+n \times T_{RFW})$ for which the electromagnetic wave must not be detected, the possibility for starting the output of electromagnetic wave by a plurality of NFC communication devices at the same timing is suppressed.

When the NFC communication device starts to output the electromagnetic wave in the initial RFCA processing, the NFC communication device becomes the initiator. In this case, the active mode is set as a communication mode and then the NFC communication device as the initiator ends the transmission of the data thereof and thereafter stops the output of electromagnetic wave. On the other hand, the passive mode is set as a communication mode and then the NFC communication device as the initiator continues to output the electromagnetic wave starting by the initial RFCA processing until the communication with the target completely ends.

Figure 10:
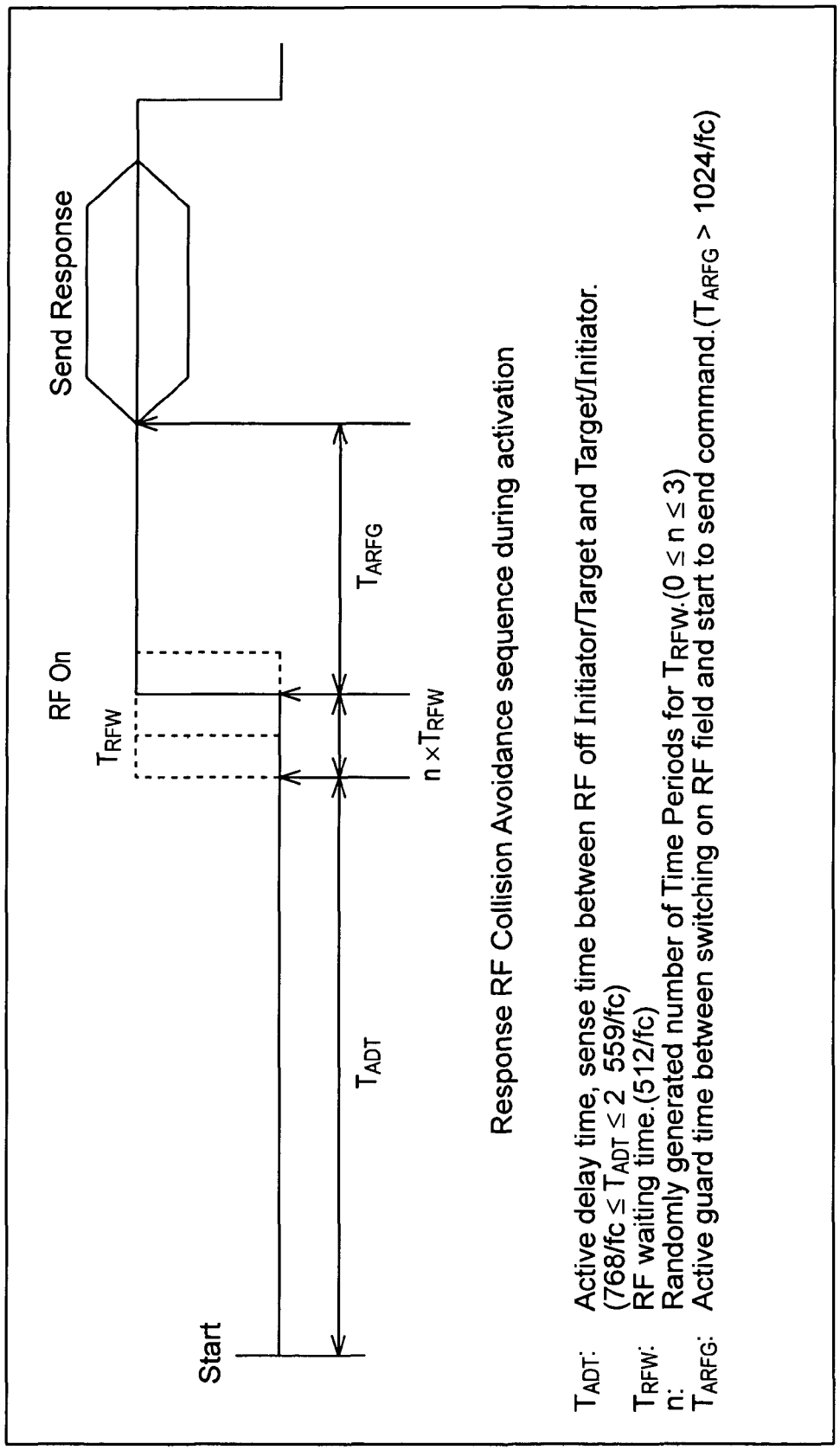
FIG. 10 is a timing chart for explaining active RFCA processing.

FIG. 10 shows the electromagnetic wave that start to be outputted by the response RFCA.

In the active mode, the NFC communication device for outputting the electromagnetic wave detects the electromagnetic wave from another device. When the NFC communication device does not detect the continuous output of the electromagnetic wave from the other device only for the time $(T_{ADT}+n \times T_{RFW})$, the output of electromagnetic wave starts and Send Response of the data starts after the passage of only the time $T_{ARFG}$ from the output timing.

Here, reference symbols n and $T_{RFW}$ in the time $(T_{ADT}+n \times T_{RFW})$ are as the same in the initial RFCA processing shown in FIG. 9. Reference symbol $T_{ADT}$ in the time $(T_{ADT}+n \times T_{RFW})$ is referred to as an active delay time that is, e.g., $768/f_c$ or more and $2559/f_c$ or less. The time $T_{ARFG}$ is referred to as an active guard time that is, e.g., longer than $1024/f_c$.

As will be obviously understood with reference to FIGS. 9 and 10, in order to start the output of electromagnetic wave by the initial RFCA processing, the electromagnetic wave must exist for at least the initial delay time $T_{IDT}$. In order to start the output of electromagnetic wave by the response RFCA processing, the electromagnetic wave must not exist for at least the active delay time $T_{ADT}$.

The initial delay time $T_{IDT}$ is longer than $4096/f_c$. On the other hand, the active delay time $T_{ADT}$ is $768/f_c$ or more and is $2559/f_c$ or less. Thus, when the NFC communication device becomes the initiator, a longer time for which the electromagnetic wave does not exist is necessary, as compared with the case in which the electromagnetic wave is outputted during the communication in the active mode. Inversely, when the NFC communication device outputs the electromagnetic wave during the communication in the active mode, the NFC communication device must output the electromagnetic wave after not so long time from the timing at which the electromagnetic wave does not exist, as compared with the case in which the NFC communication device becomes the initiator. This is because of the following reasons.

That is, one NFC communication device communicates the data in the active mode, then, another NFC communication device outputs the electromagnetic wave by itself and sends the data and thereafter stops the output of electromagnetic wave. The other NFC communication device starts to output the electromagnetic wave and sends the data. Therefore, in the communication in the active mode, all the NFC communication devices might stop the output of electromagnetic wave. When the NFC communication device becomes the initiator, it is necessary to check whether or not another device does not output the electromagnetic wave around the NFC communication device which becomes the initiator for a sufficient time so as to check that the data is not communicated around the NFC communication device in the active mode.

On the other hand, in the active mode, the initiator outputs the electromagnetic wave, thereby sending the data to the target. The initiator stops the output of electromagnetic wave and then starts the output of electromagnetic wave. Thus, the target sends the data to the initiator. After that, the target stops the output of electromagnetic wave and then the initiator starts to output the electromagnetic wave, thereby sending the data to the initiator. Then, similarly, the data is received/sent between the initiator and the target.

When the NFC communication device exists serving as the initiator around the initiator and the target in the communication in the active mode, then, one of the initiator and the target stops the output of the electromagnetic wave in the communication in the active mode, and it takes a long time until the other starts to output the electromagnetic wave, the electromagnetic wave does not exist during the long time. Thus, the NFC communication device serving as the initiator starts to output the electromagnetic wave by the initial RFCA. In this case, the communication in the active mode that has already been executed is prevented.

Therefore, the electromagnetic wave needs to be outputted in the response RFCA processing in the communication in the active mode for a not so long time after the electromagnetic wave does not exist.

As mentioned with reference to FIG. 9, the NFC communication device serving as the initiator start to output the electromagnetic wave by the initial and then sends the data. The NFC communication device serving as the initiator starts to output the electromagnetic wave, thereby becoming the initiator. The NFC communication device existing near the initiator becomes the target. In order to receive and send the data from/to the target of the initiator, the target for receiving and sending the data needs to be specified. Therefore, after the initiator starts to output the electromagnetic wave by the initial RFCA, the initiator requests an NFCID (NFC Identification) serving as information for specifying the target to at least one target existing near the initiator. The target existing near the initiator sends the NFCID for specifying the target itself to the initiator in response to the request from the initiator.

The initiator specifies the target in accordance with the NFCID sent from the target as mentioned above, and receives and sends the data from/to the specified target. Here, SDD (Single Device Detection) denotes processing in which the initiator specifies the target around (near) the initiator in accordance with the NFCID.

In the SDD processing, the initiator requests the NFCID of the target by sending a polling request frame by the initiator. The target receives the polling request frame, then, determines the NFCID thereof by the random number, and sends a polling response frame having the arrangement of the NFCID. The initiator receives the polling response frame sent by the target, thereby recognizing the NFCID of the target.

When the initiator requests the NFCID of the target therenear and a plurality of targets exist near the initiator, at least two of the plurality of targets might simultaneously send the NFCIDs. In this case, the NFCIDs sent from the at least two targets might come into collision with each other and the initiator cannot recognize the NFCIDs which come into collision.

Then, the SDD processing is performed by a method using time slot so as to prevent the collision of NFCIDs with each other as much as possible.

Figure 11:
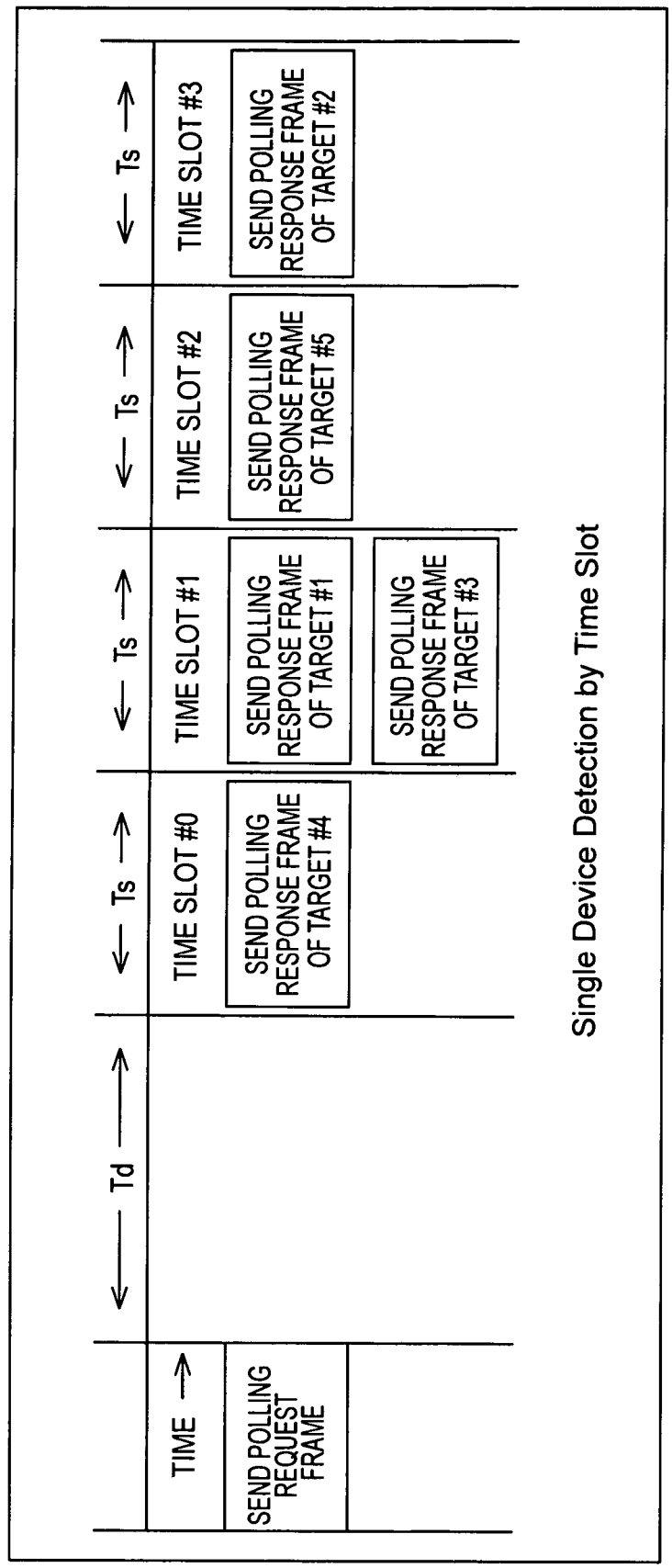
FIG. 11 is an explanatory diagram of SDD processing.

FIG. 11 shows the sequence of SDD processing performed by the time slot. Referring to FIG. 11, five targets #1, #2, #3, #4, and #5 exist near the initiator.

In the SDD processing, the initiator sends the polling request frame. After ending the transmission, only for a predetermined time $T_d$, the time slot for a predetermined time $T_s$ is provided. The time $T_d$ is, e.g., $512 \times 64/f_c$. The time $T_s$ serving as the time slot is $256 \times 64/f_c$. Further, the time slot is specified by numbering sequential integers from zero to time slots starting from the early one.

Here, four time slots #0, #1, #2, and #3 are shown in FIG. 11. However, the number of time slots may be up to 16. The initiator designates a number TSN of time slots arranged to one polling request frame. The number TSN is included in the polling request frame and then is sent to the target.

The target receives the polling request frame sent from the initiator, and recognizes the number TSN of time slots arranged to the polling request frame. Further, the target generates an integer R within a range of not less than 0 to not more than (TSN-1) by the random number. At a timing of a time slot #R specified by the integer R, the target sends the polling request frame having the NFCID of the target.

As mentioned above, the target determines, by the random number, the time slot serving as the timing for sending the polling response frame. Thus, the timing for sending the polling response frames by a plurality of targets varies, thereby preventing the collision between the polling response frames sent by the plurality of targets.

Incidentally, if the target determines the time slot serving as the timing for sending the polling response frame by using the random number, the time slots for sending the polling response frames by the plurality of targets match each other. Thus, the collision of the polling response frames might be caused. According to the embodiment, referring to FIG. 11, the polling response frame of the target #4 is sent at the time slot #0, the polling response frames of the targets #1 and #3 are sent at the time slot #1, the polling response frame of the target #5 is sent at the time slot #2, and the polling response frame of the target #2 is sent at the time slot #3. The polling response frames of the targets #1 and #3 come into collision therewith.

In this case, the initiator does not normally receive the polling response frames of the targets #1 and #3 which come into collision therewith. Therefore, the initiator resends the polling request frame, thereby requesting the transmission of the polling response frames having the NFCIDs of the targets #1 and #3 thereto. Until the initiator recognizes all the NFC-IDs of the targets #1 to #5 therenear, the transmission of the polling request frame by the initiator and the transmission of the polling response frame by the target are repeated.

When the initiator resends the polling request frame and then all the targets #1 to #5 return the polling response frames, the polling response frames might come into collision therewith again. When the target receives the polling request frame again after not so long time from the receiving time of the polling request frame from the initiator, the polling: request is ignored. In this case, according to the embodiment, with reference to FIG. 11, the initiator does not recognize the NFCIDs of the targets #1 and #3 which come into collision of the polling response for the first-sent polling request frames with each other and therefore data is neither received nor transmitted between the targets #1 and #3.

Then, the targets #2, #4, and #5 whose polling response frames are normally received and whose NFCIDs are recognized by the initiator are temporarily excluded from the communication targets, as will be described later. Thus, the polling response frames serving as responses for the polling request frames are not returned. In this case, only the targets #1 and #3 whose NFCIDs are not recognized by the first transmission of the polling request frame return the polling response frames in response to the polling request frames which are resent by the initiator. Therefore, in this case, the NFCIDs of all the targets #1 to #5 are recognized while suppressing the possibility of the collision of the polling response frames.

As mentioned above, the target receives the polling request frame and then determines (generates) the NFCID thereof by the random number. Therefore, the same NFCIDs from different targets might be arranged to the polling response frame and might be sent to the initiator. When the initiator receives the polling response frame having the same NFCID at different time slots, the polling request frame is resent to the initiator, similarly to the collision of the polling response frames.

As mentioned above, the NFC communication device receives and sends the data to/from the IC card or the reader/writer forming the existing IC card system by the transfer rate used by the IC card and the reader/writer. When the target is the IC card of the existing IC card system, the SDD processing is performed as follows.

That is, the initiator starts to output the electromagnetic wave by the initial RFCA processing. The IC card serving as the target gets the power from the electromagnetic wave, thereby starting the processing. Now, the target is the IC card of the existing IC card system and therefore the operating power is generated from the electromagnetic wave outputted by the initiator.

The target gets the power and then enters the operating state. After that, the target prepares for the reception of the polling request frame within, the longest time, 2 sec, and waits for the transmission of the polling request frame from the initiator.

On the other hand, the initiator sends the polling request frame, irrespective of whether or not the preparation for the reception of the polling request frame in the target ends.

When the target receives the polling request frame from the initiator, as mentioned above, the target sends the polling response frame to the initiator at a predetermined time slot. When the initiator normally receives the polling response frame from the target, as mentioned above, the initiator recognizes the NFCID of the target. On the other hand, when the initiator normally does not receive the polling response frame from the target, the initiator resends the polling request frame.

In this case, the target is the IC card of the existing IC card system and therefore, the operating power is generated from the electromagnetic wave outputted from the initiator. Thus, the initiator continues to output the electromagnetic wave started by the initial RFCA processing until the communication with the target completely ends.

Next, the NFC communication device sends the initiator sends the command to the target, and the target sends (returns) the response for the command from the initiator, thereby communication data.

FIG. 12 shows the command sent to the target by the initiator and the response sent to the initiator by the target.

Referring to FIG. 12, the command is designated by describing characters REQ after an under bar (_), and the response is designated by describing characters RES after the under bar (_). According to the embodiment, with reference to FIG. 12, the type of commands includes six ones of ATR_REQ, WUP_REQ, PSL_REQ, DEP_REQ, DSL_REQ, and RLS_REQ. Similarly to the commands, the type of responses for the command includes six ones of ATR_RES, WUP_RES, PSL_RES, DEP_RES, DSL_RES, and RLS_RES. As mentioned above, the initiator sends the command (request) to the target, and the target sends the response corresponding to the command to the initiator. The command is sent by the initiator, and the response is sent by the target.

The ATR_REQ command indicates that the initiator sends a notification indicating the property (specification) to the target and requests the property of the target to the target. The property of the initiator or target includes the transfer rate of the data sent or received by the initiator or the target. Further, the command ATR_REQ includes not only the property of the initiator but also the NFCID for specifying the initiator, and the target receives the command ATR_REQ, thereby recognizing the property and the NFCID of the initiator.

The response ATR_RES is sent to the initiator as the response for the command ATR_REQ when the target receives the command ATR_REQ. The response ATR_RES has the property and the NFCID of the target.

Further, the information on the transfer rate as the property arranged to the command ATR_REQ or the response ATR_RES includes all the transfer rates of the data sent and received by the initiator and the target. In this case, the reception and transmission of the command ATR_REQ and the response ATR_RES are performed once between the initiator and the target, and thus the initiator recognizes the transfer rate for receiving and sending the data by the target and the target recognizes the transfer rate for receiving and sending the data by the initiator.

The command WUP_REQ is sent when the initiator selects the target for communication. That is, the command DSL_REQ, which will be described later, is sent from the initiator to the target, thereby setting the target to a deselecting state (state for prohibiting the transmission (response) of the data to the initiator. The command WUP_REQ is sent upon resetting the deselecting state and sending the target to a state for sending the data to the initiator. The command WUP_REQ has the NFCID of the target, which resets the deselecting state. From among the targets which receive the command WUP_REQ, the target specified by the NFCID arranged to the command WUP_REQ resets the deselecting state.

The response WUP_RES is sent as the response for the command WUP_REQ when the target specified by the NFCID arranged to the WUP_REQ resets the deselecting state from among the targets which receive the command WUP_REQ.

The command PSL_REQ is sent when the initiator changes a communication parameter on the communication with the target. Here, the communication parameter includes the transfer rate of the data received and sent between the initiator and the target.

The command PSL_REQ has a value of the communication parameter after the change, and is sent from the initiator to the target. The target receives the command PSL_REQ, and changes the communication parameter in accordance with the value of the communication parameter arranged thereto. Further, the target sends the response PSL_RES for the command PSL_REQ.

The command DEP_REQ is sent when the initiator receives and sends (exchanges) the data (so-called real data) (with the target), and has the data to be sent to the target. The response DEP_RES is sent, as the response for the command DEP_REQ, by the target, and has the data to be sent to the initiator. Therefore, by the command DEP_REQ, the data is sent from the initiator to the target. By the response DEP_RES for the command DEP_REQ, the data is sent from the target to the initiator.

The command DSL_REQ is sent when the initiator sets the target to the deselecting state. The target that receives the command DSL_REQ sends the response DSL_RES for the command DSL_REQ, thereby being set to the deselecting state. After that, the target does not respond to the command other than the command WUP_REQ (that is, does not return the response).

The command RLS_REQ is sent when the initiator completely ends the communication with the target. The target that receives the command RLS_REQ sends the response RLS_RES for the command RLS_REQ, thereby completely ending the communication with the initiator.

Commonly, the commands DSL_REQ and RLS_REQ reset the target from the communication target with the initiator. However, the target reset by the command DSL_REQ becomes a communicable state with the initiator by the command WUP_REQ again. The target reset by the command RLS_REQ does not become the communicable state with the initiator only by receiving and sending the above-mentioned polling request frame and polling response frame to/from the initiator. The commands DSL_REQ and RLS_REQ are different in the above point.

The reception and transmission of the command and the response are executed on, e.g., a transport layer.

Figure 13:
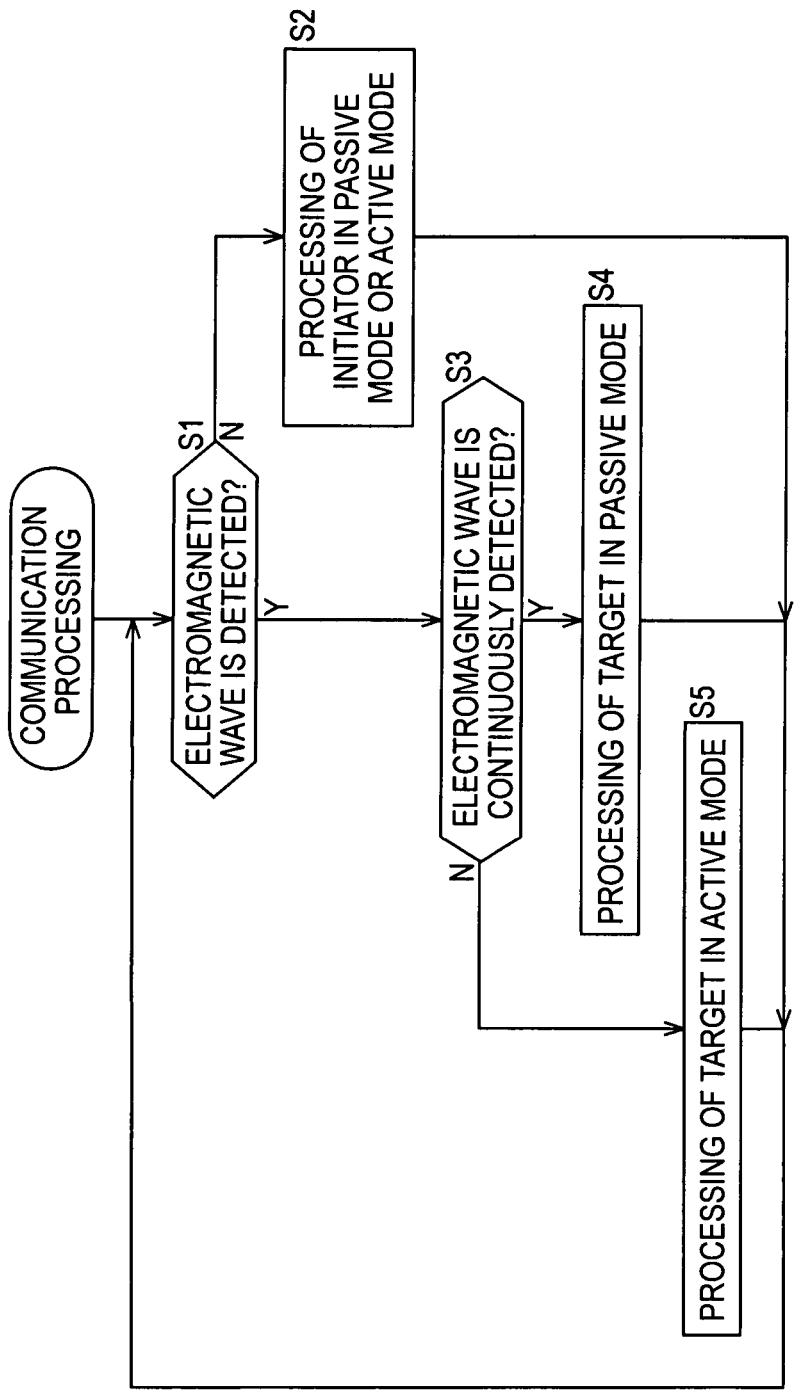
FIG. 13 is a flowchart for explaining processing of an NFC communication device.

Next, a description is given of communication processing of the NFC communication device with reference to a flowchart of FIG. 13.

Starting the communication, in step Si, the NFC communication device determines whether or not the electromagnetic wave of another device is detected.

In the NFC communication device (shown in FIG. 4), the control unit 21 monitors the detecting result of the electromagnetic wave (electromagnetic wave that is similar to the electromagnetic wave and that has the similar frequency band used by the NFC communication device) of the detecting unit 23. In step S1, it is determined based on the detecting result whether or not the electromagnetic wave of the other device is detected. In this case, the threshold setting unit 24 shown in FIG. 4 sets, as a threshold, a magnetic-flux density TH1 for determining the suppression of output of a carrier, which will be described later with reference to FIGS. 24 to 26, and supplies the threshold to the detecting unit 23. Further, the detecting unit 23 detects the level of the magnetic-flux density TH1 or more for determining the suppression of the output of carrier, as the threshold supplied from the threshold setting unit 24.

When it is determined in step S1 that the electromagnetic wave of the other device is not detected, the processing sequence advances to step S2 whereupon the NFC communication device sets the communication mode to the passive mode or the active mode and performs the processing of the initiator in the passive mode or the processing of the initiator in the active mode, which will be described later. The NFC communication device returns to step S1 after ending the processing and, after that, repeats the similar processing.

In step S2, the communication mode of the NFC communication device may be the passive mode and the active mode, as mentioned above. Only when the target becomes the target in the passive mode of the IC card in the existing IC card system, in step S2, the NFC communication device needs to set the communication mode as the passive mode, and to perform the processing of initiator in the passive mode.

When it is determined in step S1 that the electromagnetic wave of the other device is detected, that is, the electromagnetic wave of the other device is detected near the NFC communication device, the processing sequence advances to step S3 whereupon the NFC communication device determines whether or not the electromagnetic wave detected in step S1 is continuously detected.

When it is determined in step S3 that the electromagnetic wave is continuously detected, the processing sequence advances to step S4 whereupon the NFC communication device sets the communication mode as the passive mode and performs the target processing in the passive mode, which will be described later. That is, when the electromagnetic wave is continuously detected, another device near the NFC communication device becomes the initiator in the passive mode, thereby continuously outputting the electromagnetic wave started by the initial RFCA processing. The NFC communication device becomes the target in the passive mode,
and performs the processing. After ending the processing, the processing returns to step S1 and then the similar processing is repeated.

Further, when it is determined in step S3 that the electromagnetic wave is not continuously detected, the processing sequence advances to step S5 whereupon the NFC communication device sets the communication mode as the active mode and executes the target processing in the active mode, which will be described later. That is, when the electromagnetic wave is not continuously detected, the other device near the NFC communication device becomes the initiator in the active mode and starts to output the electromagnetic wave by the initial RFCA processing. After that, the output of electromagnetic wave stops. Thus, the NFC communication device becomes the target in the active mode. After ending the processing, the processing returns to step S1 and then the similar processing is repeated.

Figure 14:
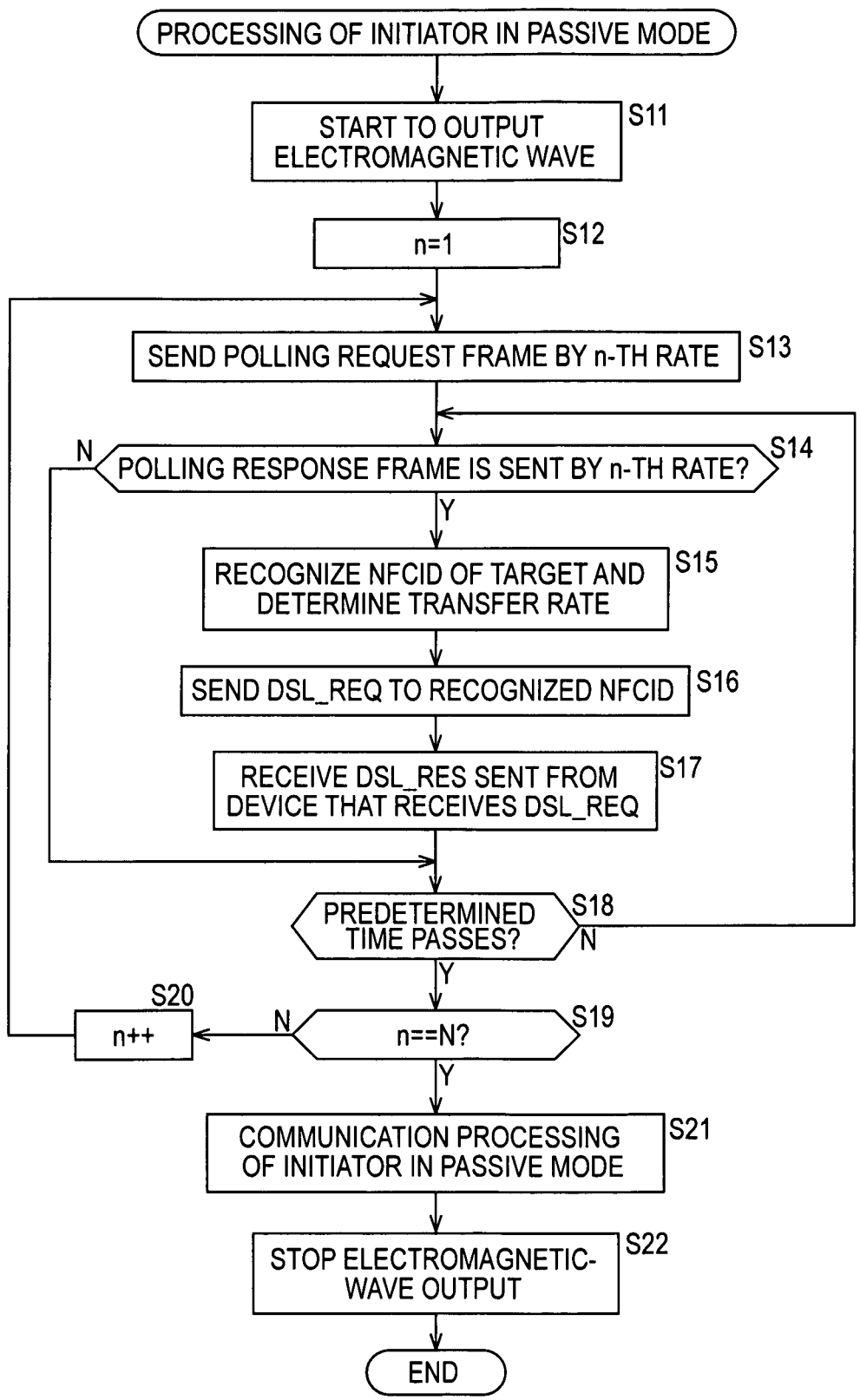
FIG. 14 is a flowchart showing processing of an initiator in the passive mode.

Next, a description is given of the processing of the initiator in the passive mode by the NFC communication device with reference to a flowchart of FIG. 14.

In the processing-of the initiator in the passive mode, in step S11, the NFC communication device starts to output the electromagnetic wave. Step S11 in the processing of the initiator in the passive mode is executed when the electromagnetic wave is not detected in step S1 in FIG. 13 as mentioned above. That is, when the electromagnetic wave is not detected in step S1 in FIG. 13, in step S11, the NFC communication device starts to output the electromagnetic wave. Therefore, the processing in steps S1 and S11 corresponds to the above-mentioned initial RFCA processing.

In step S12, the NFC communication device sets a variable n indicating the transfer rate as an initial value and then the processing sequence advances to step S13. In step S13, the NFC communication device sends the polling request frame by an n-th transfer rate (hereinafter, referred to as an n-th rate if necessary) and then the processing sequence advances to step S14. In step S14, the NFC communication device determines whether or not the other device sends the polling response frame by the n-th rate.

When it is determined in step S14 that the other device does not send the polling response frame, that is, the other device near the NFC communication device does not communicate the data by the n-th rate and the polling response frame for the polling request frame sent by the n-th rate is not returned, steps S15 to S17 are skipped and then the processing sequence advances to step S18.

When it is determined in step S14 that the other device sends the polling response frame by the n-th rate, that is, the other device near the NFC communication device communicates the data by the n-th rate and the polling response frame for the polling request frame sent by the n-th rate is returned, the processing sequence advances to step S15 whereupon the NFC communication device sets the other device that returns the polling response frame as the target in the passive mode, the NFCID of the target is recognized by the NFCID arranged to the polling response frame, and it is recognized that the target is communicable by the n-th rate.

In step S15, the NFC communication device recognizes the NFCID of the target in the passive mode and that the target is communicable by the n-th rate. Then, the transfer rate to the target is (temporarily) determined as the n-th rate. As long as the command PSL_REQ does not change the transfer rate, the communication with the target is performed by the n-th rate.

After that, in step S16, the NFC communication device sends, by the n-th rate, the command DSL_REQ to the target of the NFCID recognized in step S15 (the target in the passive mode). Thus, the target is set to the deselecting state so as to prevent the responding operation to the sent polling request frame and the processing sequence advances to step S17.

In step S17, the NFC communication device receives the response DSL_RES returned by the target in the deselecting state set by the command DSL_REQ sent in step S16, and then the processing sequence advances to step S18.

In step S18, the NFC communication device sends the polling request frame by the n-th rate in step S13 and then determines whether or not a predetermined time passes. The predetermined time in step S18 is zero or more.

When the polling request frame in step S13 is sent by the n-th rate and the predetermined does not pass in step S18, the processing sequence returns to step S13 and the processing in steps S13 to S18 is repeated.

By repeating the processing in steps S13 to S18, the NFC communication device receives the polling response frame sent at the timing of the different time slot as mentioned above with reference to FIG. 11.

When the polling request frame in step S13 is sent by the n-th rate and then the predetermined time passes in step S18, the processing sequence advances to step S19 whereupon the NFC communication device determines whether or not a variable n is equal to the value N serving as the maximum value. When it is determined in step S19 that the variable n is not equal to the maximum value N, that is, when the variable n is less than the maximum value N, the processing sequence advances to step S20 whereupon the NFC communication device increments the variable n by one. Then, the processing sequence returns to step S13 and the processing in steps S13 to S20 is repeated.

By repeating the processing in steps S13 to S20, the NFC communication device sends the polling request frame by N transfer rates, and receives the polling response frames returned by the transfer rates.

When it is determined in step S19 that the variable n is equal to the maximum value N, that is, the NFC communication device sends the polling request frame by N N transfer rates and the polling response frames returned by the transfer rates are received, the processing sequence advances to step S21 whereupon the NFC communication device performs the communication processing (communication processing of the initiator in the passive mode) as the initiator in the passive mode. Here, the communication processing of the initiator in the passive mode will be described later.

After ending the communication processing of the initiator in the passive mode, the NFC communication device advances from step S21 to step S22 whereupon the output of the electromagnetic wave starting in step S11 and then the processing ends.

Figure 15:
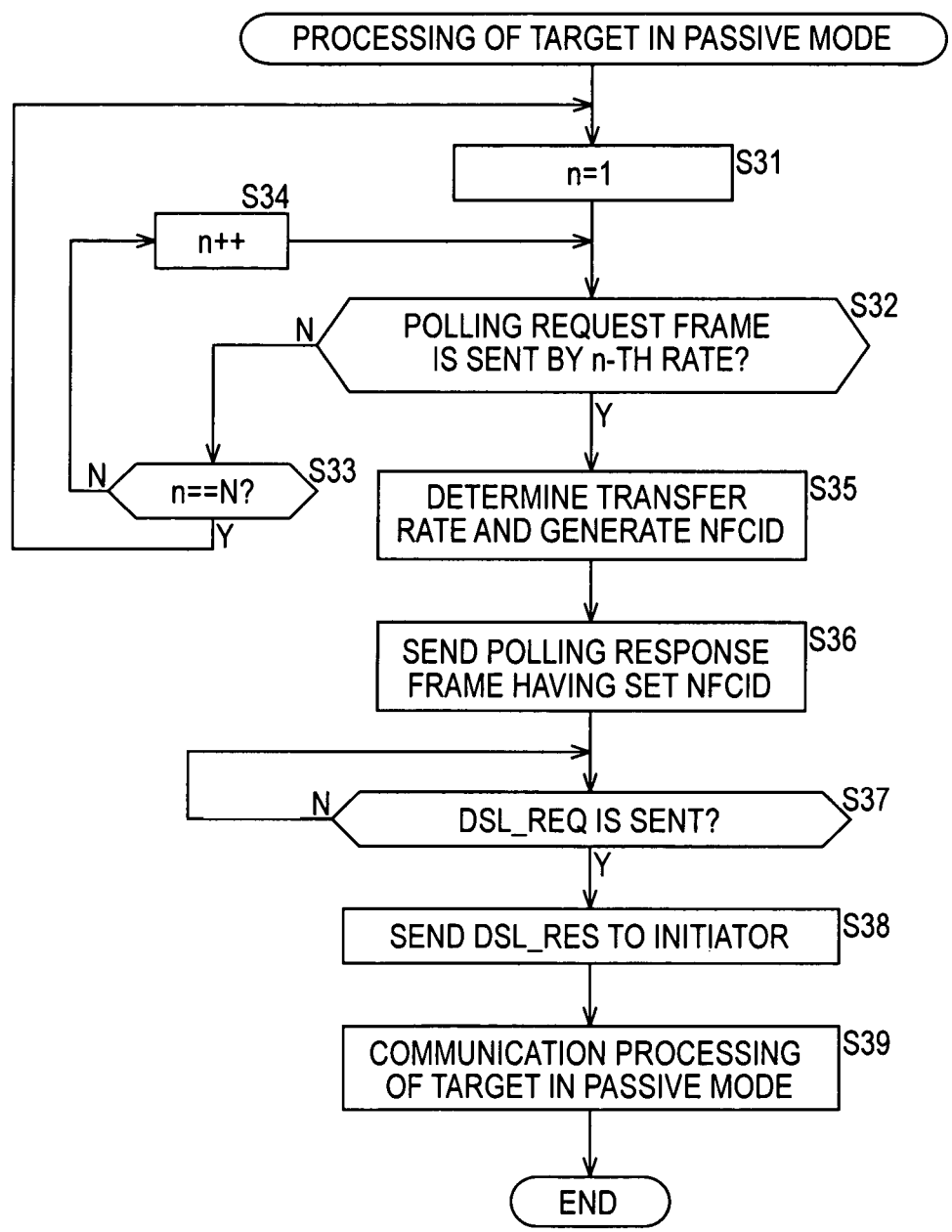
FIG. 15 is a flowchart showing target processing in the passive mode.

Next, a description is given of the processing of the target in the passive mode by the NFC communication device with reference to FIG. 15.

In the processing of the target in the passive mode, first, in step S31, the NFC communication device sets the variable n indicating the transfer rate as the initial value, e.g., 1 and then the processing sequence advances to step S32. In step S32, the NFC communication device determines whether or not another device serving as the initiator in the passive mode sends the polling request frame by the n-th rate.

When it is determined in step S32 the initiator in the passive mode does not send the polling request frame, that is, another device near the NFC communication device does not communicate the data by the n-th rate and the polling request fame is not sent by the n-th rate, the processing sequence advances to step S33 whereupon the NFC communication device determines whether or not the variable n is equal to the maximum value N. When it is determined in step S33 that the variable n is not equal to the maximum value N, that is, when the variable n is less than the maximum value N, the processing sequence advances to step S34 whereupon the NFC communication device increments the variable n by one. Then, the processing sequence returns to step S32 and the processing in steps S32 to S34 is repeated.

When it is determined in step S33 that variable n is equal to the maximum value N, the processing sequence returns to step S31 and then the processing in steps S31 to S34 is repeated. Until receiving the polling request frame sent by any of the N transfer rates from the initiator in the passive mode, the processing in steps S31 to S34 is repeated.

When it is determined in step S32 that the initiator in the passive mode sends the polling request frame, that is, the NFC communication device normally receives the polling request frame by the n-th rate, the processing sequence advances to step S35 whereupon the NFC communication device determines the transfer rate between the initiators as the n-th transfer rate. Further, the NFC communication device generates the NFCID thereof by the random number and then the processing sequence advances to step S36. In step S36, the NFC communication device sends the polling response frame having the NFCID thereof by the n-th rate and then the processing sequence advances to step S37.

After the NFC communication device sends the polling response frame by the n-th rate in step S36, the NFC communication device communicates the data by the n-th rate only when the initiator in the passive mode sends the command PSL_REQ to indicate the change of the transfer rate.

In step S37, the NFC communication device determines whether or not the initiator in the passive mode sends the command DSL_REQ. When it is determined in step S37 that the command DSL_REQ is not sent, the processing sequence returns to step S37 whereupon the NFC communication device waits for the transmission of the command DSL_REQ from the initiator in the passive mode.

When it is determined in step S37 that the initiator in the passive mode sends the command DSL_REQ, that is, the NFC communication device receives the command DSL_REQ, the processing sequence advances to step S38 whereupon the NFC communication device sends the response DSL_REQ for the command DSL_REQ, thereby entering the deselecting state. Then, the processing sequence advances to step S39.

In step S39, the NFC communication device performs the communication processing (communication processing of the target in the in the passive mode) as the target in the passive mode. The communication processing of the target in the passive mode ends and then the processing ends. The communication processing of the target in the passive mode will be described later.

Figure 16:
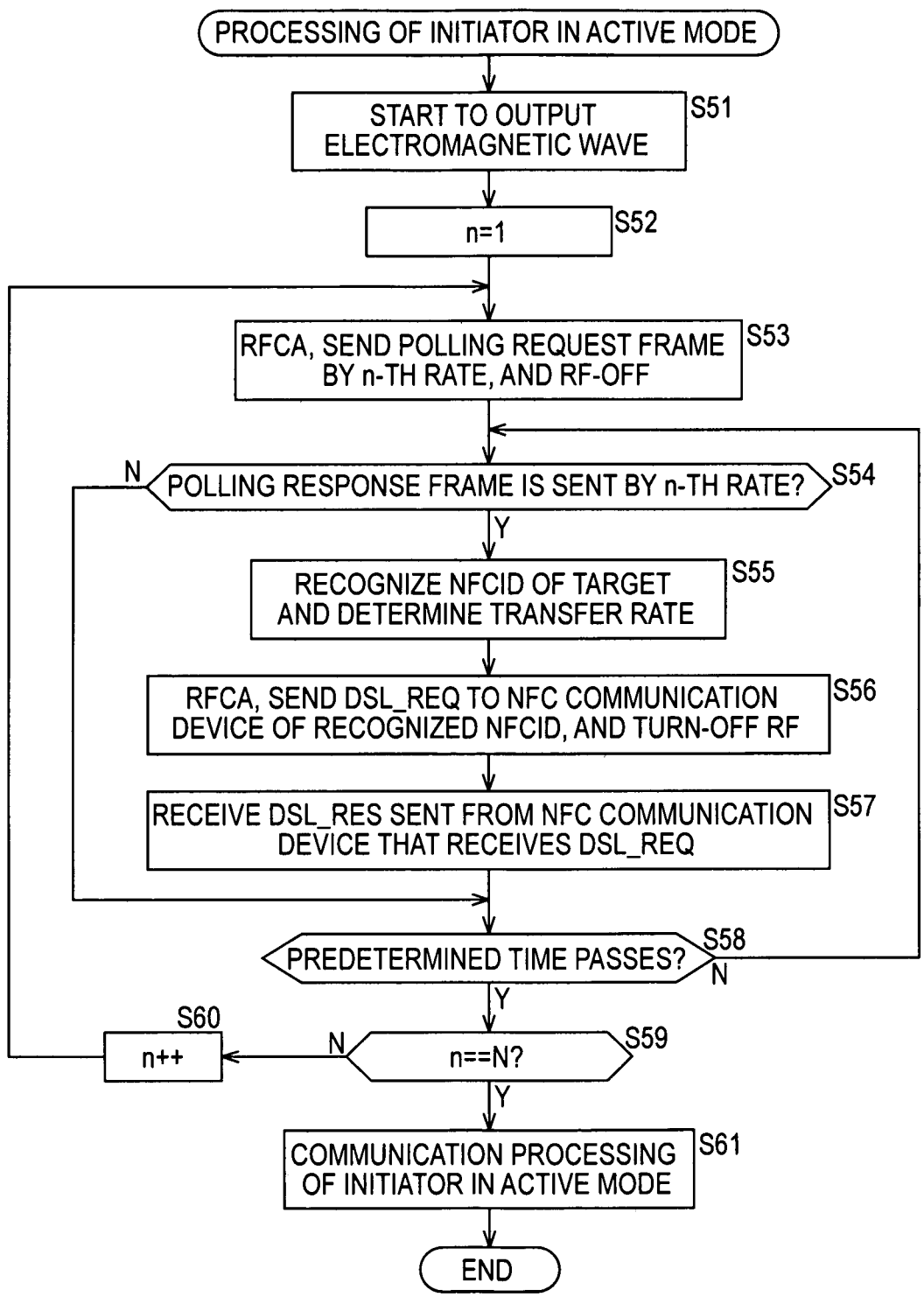
FIG. 16 is a flowchart showing processing of the initiator in the active mode.

Next, a description is given of the processing of the initiator in the active mode by the NFC communication device with reference to a flowchart of FIG. 16.

In steps S51 to S61, the initiator in the active mode performs the same processing in steps S11 to S21 as that of the initiator in the passive mode in FIG. 14. In the processing of the initiator in the passive mode shown in FIG. 14, the NFC communication device continuously outputs the electromagnetic wave until the processing ends. In the processing of the initiator in the active mode, unlike the initiator in the passive mode, the NFC communication device outputs the electromagnetic wave only when the data is sent.

That is, in step S51, the NFC communication device starts to output the electromagnetic wave. The processing in step S51 in the processing of the initiator in the active mode is performed when the electromagnetic wave is not detected in step S1 in FIG. 13. That is, when the electromagnetic wave is not detected in step S1 in FIG. 13, in step S51, the NFC communication device starts to output the electromagnetic wave. Therefore, the processing in steps S1 and S51 corresponds to the initial RFCA processing.

After that, in step S52, the NFC communication device sets the variable n indicating the transfer rate as the initial value, e.g., one. Then, the processing advances to step S53. In step S53, the NFC communication device sends the polling request frame by the n-th rate and stops the output of electromagnetic wave (hereinafter, properly referred to as RF off-processing). The, the processing sequence advances to step S54.

In step S53, the NFC communication device starts to output the electromagnetic wave by the active RFCA processing before sending the polling request frame. However, when the variable n is one as the initial value, the initial RFCA processing corresponding to the processing in steps S1 and S51 has already outputted the electromagnetic wave. Therefore, the active RFCA processing is not necessary.

In step S54, the NFC communication device determines whether or not another device sends the polling response frame by the n-th rate.

When it is determined that in step S54 that the other device does not send the polling response frame, that is, when the other device near the NFC communication device does not communicate the data by the n-th rate and the polling response frame for the polling request frame sent by the n-th rate is not returned, the processing in steps S55 to S57 is skipped and then the processing advances to step S58.

Further, when it is determined in step S54 that the other device sends the polling response frame by the n-th rate, that is, when the other device near the NFC communication device communicates the data by the n-th rate and the polling response frame for the polling request frame sent by the n-th rate is returned, the processing sequence advances to step S55 whereupon the NFC communication device sets the other device that returns the polling response frame as the target in the active mode and the NFCID of the target is recognized by the NFCID arranged to the polling response frame. Further, the NFC communication device recognizes that the target is communicable by the n-th rate.

When the NFC communication device recognizes, in step S55, the NFCID of the target in the active mode and that the target is communicable by the n-th rate, the transfer rate between the targets is determined as the n-th rate. The data is communicated with the target by the n-th rate except for when the command PSL_REQ changes the transfer rate.

In step S56, the NFC communication device starts to output the electromagnetic wave by the active RFCA processing and sends the command DSL_REQ to the target of the NFCID recognized in step S55 (target in the active mode) by the n-th rate. Thus, the target enters the deselecting state for sending no response for the subsequently-sent polling request frame. After that, the NFC communication device performs the RF off-processing and then the processing sequence advances from step S56 to step S57.

In step S57, the NFC communication device receives the response DSL_RES returned by the target set in the deselecting state by the command DSL_REQ in response to the command DSL_REQ sent in step S56 and then the processing sequence advances to step S58.

In step S58, the NFC communication device sends the polling request frame in step S53 by the n-th rate and then determines whether or not a predetermined time passes.

When it is determined in step S58 that the polling request frame in step S53 is sent by the n-th rate and then a predetermined time does not pass, the processing sequence returns to step S53. Then, the processing in steps S53 to S58 is repeated.

When it is determined in step S58 that the polling request frame in step S53 is sent by the n-th rate and then a predetermined time passes, the processing sequence advances to step S59 whereupon the NFC communication device determines whether or not the variable n is equal to the maximum value N. When it is determined in step S59 that the variable n is not equal to the maximum value N, that is, when the variable n is less than the maximum value N, the processing sequence advances to step S60 whereupon the NFC communication device increments the variable n by one and then the processing sequence returns to step S53. Then, the processing in steps S53 to S60 is repeated.

By repeating the processing in steps S53 to S60, the NFC communication device sends the polling request frame by the N transfer rates and receives the polling response frames returned by the transfer rates.

When it is determined in step S59 that the variable n is equal to the maximum value N, that is, when the NFC communication device sends the polling request frames by N N transfer rates and receives the polling response frames returned by the transfer rates, the processing sequence advances to step S61 whereupon the NFC communication device performs the communication processing (communication processing of the initiator in the active mode) as the initiator in the active mode. Then, the processing ends. The communication processing of the initiator in the active mode will be described later.

Figure 17:
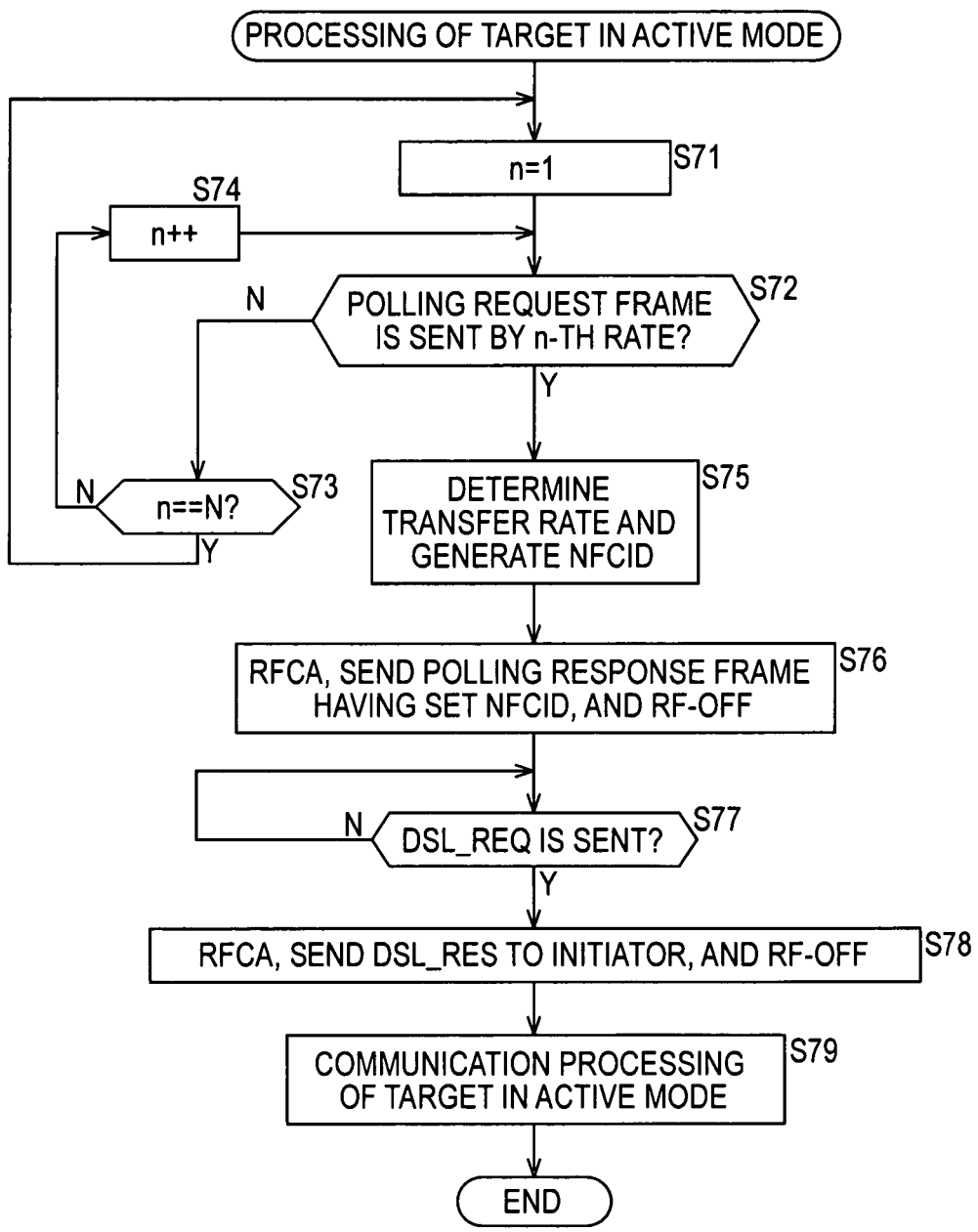
FIG. 17 is a flowchart showing target processing in the active mode.

Next, a description is given of the processing of the target in the active mode by the NFC communication device with reference to FIG. 17.

In the processing of the target in the active mode, in steps S71 to S79, the same processing as the processing of the target in the passive mode in steps S31 to S39 in FIG. 15 is performed. In the processing of the target in the passive mode in FIG. 15, the NFC communication device modulates the load of the electromagnetic wave outputted by the initiator in the passive mode to send the data. However, unlike the processing of the target in the passive mode, in the processing of the target in the active mode, the NFC communication device outputs the electromagnetic wave by itself and sends the data.

That is, in the processing of the target in the active mode, in steps S71 to S75, the same processing as that in steps S31 to S35 in FIG. 15 is performed.

After the processing in step S75, the processing sequence advances to step S76 whereupon the NFC communication device starts to output the electromagnetic wave by the active RFCA processing, and sends the polling response frame having the NFCID thereof by the n-th rate. In step S76, the NFC communication device performs the RF off-processing and then the processing sequence advances to step S77.

After sending the polling response frame by the n-th rate in step S76, the NFC communication device communicates the data by the n-th rate except for when the change of transfer rate is instructed by sending the command PSL_REQ from the initiator in the active mode.

In step S77, the NFC communication device determines whether or not the initiator in the active mode sends the command DSL_REQ. When it is determined in step S77 that the initiator in the active mode does not send the command DSL_REQ, the processing sequence returns to step S77. Then, the NFC communication device waits for the transmission of the command DSL_REQ from the initiator in the active mode.

When it is determined in step S77 that the initiator in the active mode sends the command DSL_REQ, that is, when the NFC communication device receives the command DSL_REQ, the processing sequence advances to step S78 whereupon the NFC communication device starts to output the electromagnetic wave by the active RFCA processing and sends the response DSL_REQ for the command DSL_REQ. Further, in step S78, the NFC communication device performs the RF off-processing, thereby entering the deselecting state. Then, the processing sequence advances to step S79.

In step S79, the NFC communication device performs the communication processing (communication processing of the target in the active mode) as the target in the active mode. Then, after ending the communication processing of the target in the active mode, the processing ends. The communication processing of the target in the active mode will be described later.

Figure 18:
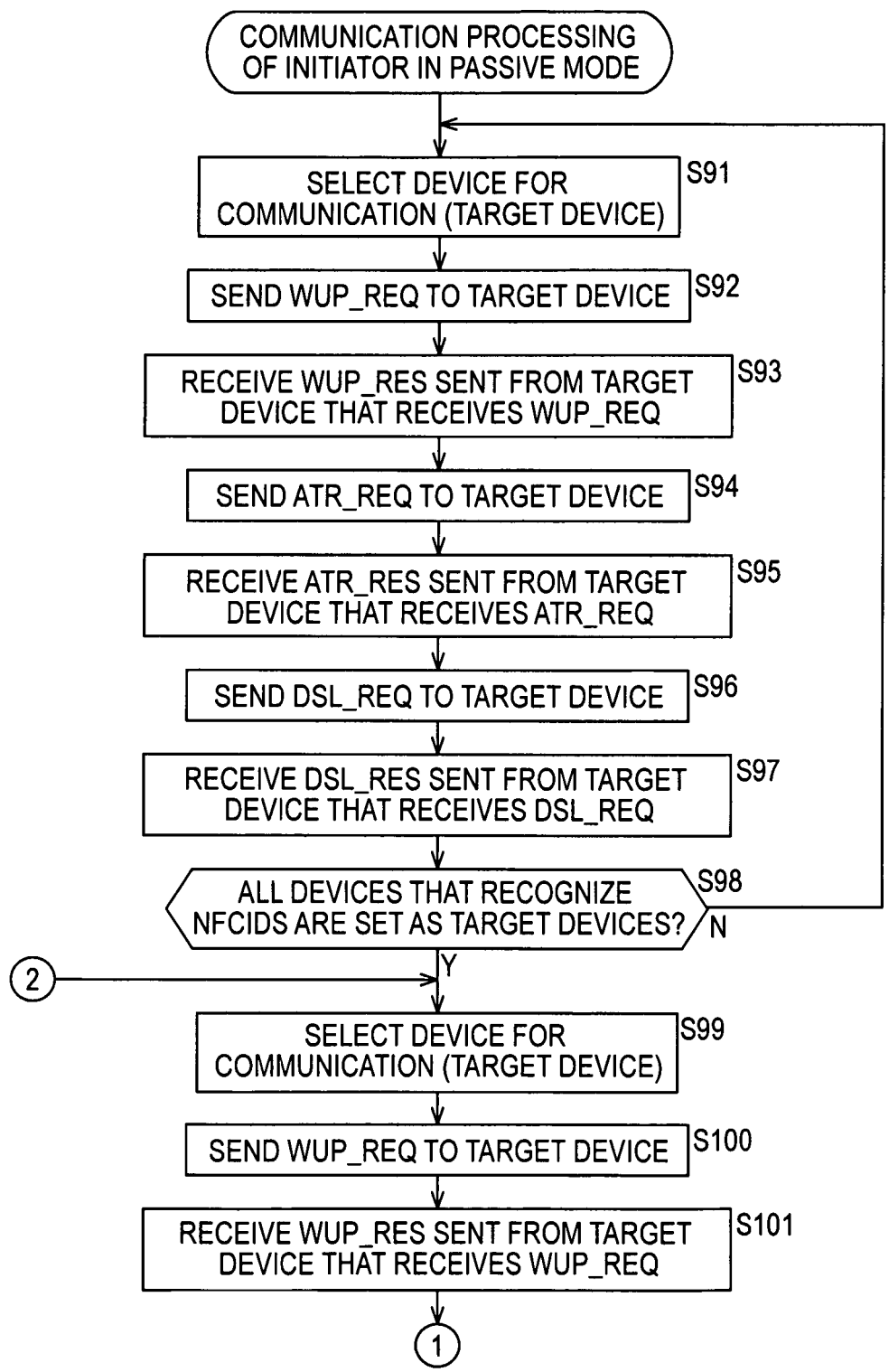
FIG. 18 is a flowchart showing communication processing of the initiator in the passive mode.
Figure 19:
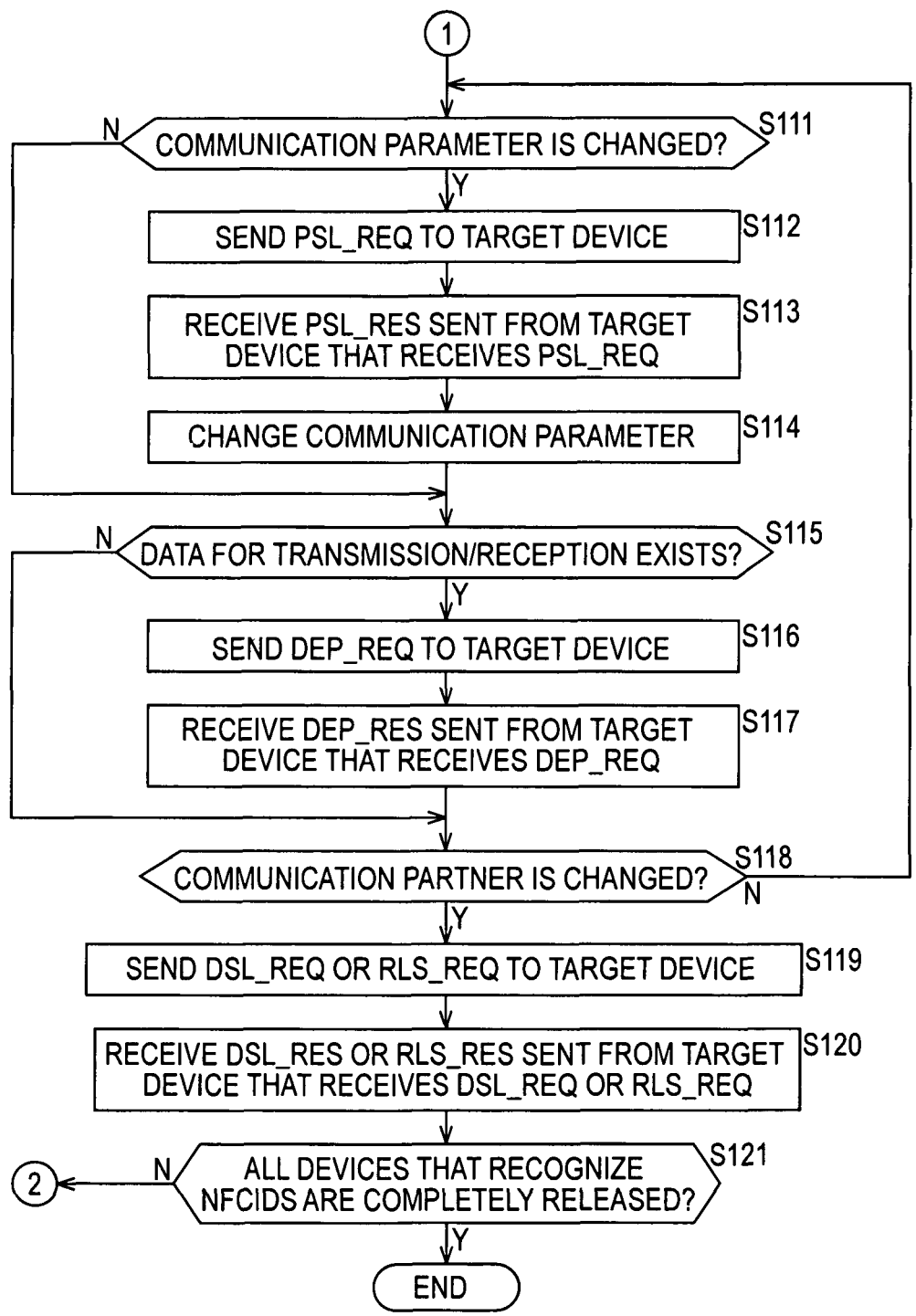
FIG. 19 is a flowchart showing communication processing of the initiator in the passive mode.

Next, a description is given of the communication processing of the initiator in the passive mode in step S21 in FIG. 14 with reference to flowcharts of FIGS. 18 and 19.

In step S91, the NFC communication device serving as the initiator in the passive mode selects the device for communication (hereinafter, properly referred to as a target device) from the targets that recognize the NFCIDs in step S15 in FIG. 14, and the processing routine advances to step S92. In step S92, the command WUP_REQ is sent to the target device. Thus, the command DSL_REQ in step S16 in FIG. 14 is sent, thereby resetting the deselecting state of the target device (hereinafter, properly referred to as "wake up").

Then, the NFC communication device waits for the transmission of the response WUP_RES for the command WUP_REQ of the target device. The processing advances to step S93 from step S92. The response WUP_RES is received and then the processing sequence advances to step S94. In step S94, the NFC communication device sends the command ATR_REQ to the target device. The NFC communication device waits for the transmission of the response ATR_RES for the command ATR_REQ of the target device and then the processing sequence advances to step S95 from step S94. In step S95, the response ATR_RES is received.

Here, the NFC communication device and the target device receive and send the command ATR_REQ having the property and the response ATR_RES as mentioned above. Thus, the NFC communication device and the target device recognize the communicable transfer rate.

After that, the processing sequence advances to step S96 from step S95. The NFC communication device sends the command DSL_REQ to the target device, thereby setting the target device in the deselecting state. The NFC communication device waits for the transmission of the response DSL_RES for the command DSL_REQ of the target device. Then, the processing sequence advances to step S97 from step S96. The response DSL_RES is received and then the processing sequence advances to step S98.

In step S98, the NFC communication device determines whether or not all the targets that recognize the NFCIDs in step S15 in FIG. 14 are selected as the target devices in step S91. When the NFC communication devices determines in step S98 that the target that is not selected as the target device exists, the processing sequence returns to step S91 whereupon the NFC communication device newly selects, as the target device, one of the targets that are not selected as the target devices and then the similar processing is repeated.

When the NFC communication device determines in step S98 that all the targets that recognize the NFCIDs in step S15 in FIG. 14 are selected as the target devices in step S91, that is, when the NFC communication device receives and sends the command ATR_REQ and the response ATR_RES to/from all the targets that recognize the NFCIDs and thus the targets recognize the communicable transfer rates of the targets and the processing sequence advances to step S99. In step S99, the NFC communication device selects the device for communication (target device) from the targets to which the command ATR_REQ and the response ATR_RES are received and sent in steps S94 and S95. Then, the processing sequence advances to step S100.

In step S100, the NFC communication device sends the command WUP_REQ to the target device. Thus, in step S96, the command DSL_REQ is sent, thereby waking up the target device in the deselecting state. The NFC communication device waits for the transmission of the response WUP_RES for the command WUP_REQ of the target device. Then, the processing sequence advances to step S101 from step S100. In step S101, the response WUP_RES is received and then the processing sequence advances to step Sill in FIG. 19.

In step S111, the NFC communication device determines whether or not the transfer rate such as the communication parameter for communication with the target device is changed.

The NFC communication device receives, from the target device, the response ATR_RES in step S95 in FIG. 18, and recognizes, based on the property arranged to the response ATR_RES, the communication parameter communicable by the target device. When the NFC communication device can communicate the data with the target device by the transfer rate higher than the current one, the NFC communication device determines in step S111 that the communication parameter is changed to change the transfer rate to be higher. Further, when the NFC communication device can communicate the data with the target device by a transfer rate lower than the current transfer rate and the current communication environment has the high noise level, the NFC communication device determines in step S111 that the communication parameter is changed to change the transfer rate to be lower so as to reduce the transfer error. When the data can be communicated between the NFC communication device and the target device by the transfer rate different from the current transfer rate, the communication can continue by the current transfer rate.

When it is determined in step S111 that the communication parameter for communication with the target device is not changed, that is, when the communication continues between the NFC communication device and the target device by the communication parameter such as the current transfer rate, the processing in steps S112 to S114 is skipped and then the processing sequence advances to step S115.

When it is determined in step S111 that the communication parameter in the communication with the target device is changed, the processing routine advances to step S112 whereupon the NFC communication device arranges the value of the communication parameter after changing to the command PSL_REQ and sends the value of the communication parameter to the target device. The NFC communication device waits for the transmission of the response PSL_RES for the command PSL_REQ to the target device. Then, the processing routine advances from step S112 to S113 whereupon the response PSL_RES is received and the processing routine advances to step S114.

In step S114, the NFC communication device changes the communication parameter such as the transfer rate in the communication with the target device to the value of the communication parameter arranged to the command PSL_REQ sent in step S112. The NFC communication device communicates the data with the target device with the target device in accordance with the communication parameter such as the transfer rate of the value changed in step S114 only when the command PSL_REQ and the response PSL_RES are received and sent again.

By the reception and transmission (negotiation) of the command PSL_REQ and the response PSL_RES, except for the transfer rate, e.g., the encoding system of the encoding unit 16 (decoding unit 14) in FIG. 4 and the modulating system of the modulating unit 19 and the load modulation unit 20 (demodulating unit 13) are performed for changing.

After that, in step S115, the NFC communication device determines whether or not the data to be received or sent to/from the target device exists. When it is determined in step S115 that the data to be received or sent to/from the target device does not exist, steps S116 and S117 are skipped and then the processing sequence advances to step S118.

When it is determined in step S115 that the data to be received or sent to/from the target device exists, the processing sequence advances to step S116 whereupon the NFC communication device sends the command DEP_REQ to the target device. When it is determined in step S115 that the data to be received or sent to/from the target device exists, in step S116, further, the NFC communication device arranges the data to the command DEP_REQ and sends the data.

The NFC communication device waits for the transmission of the response DEP-RES for the command DEP_REQ of the target device and then the processing sequence advances from step S116 to step S117 whereupon the response DEP_RES is received. Then, the processing sequence advances to step S118.

By receiving and sending the command DEP_REQ and the response DEP_RES as mentioned above, so-called real data is received and sent between the NFC communication device and the target device.

In step S118, the NFC communication device determines whether or not the communication partner is changed. When it is determined in step S118 that the communication partner is not changed, that is, when the data to be received or sent to/from the target device exists, the processing sequence returns to step S111 and then the similar processing is repeated.

When it is determined in step S118 that the communication partner is changed, that is, when the data for reception/transmission to/from the target device does not exist but the data for reception and transmission to/from another communication partner exists, the processing sequence advances to step S119 whereupon the NFC communication device sends the command DSL_REQ or RLS_REQ to the target device. The NFC communication device waits for the transmission of the response DSL_RES or RLS_RES for the command DSL_REQ or RLS_REQ of the target device and then the processing sequence advances from step S119 to S120 whereupon the response DSL_RES or RLS_RES is received.

The NFC communication device sends the command DSL_REQ or RLS_REQ to the target device as mentioned above. Thus, the target as the target device is released from the communication target with the NFC communication device as the initiator. The target released by the command DSL_REQ is in the communicable state with the initiator again by the command WUP_UP. The target released by the command RLS_REQ is not in the communicable state with the initiator by receiving and sending the polling request frame and the polling response frame to/from the initiator.

The target is released from the communication target with the initiator, by sending the command DSL_REQ or RLS_REQ as mentioned above from the initiator to the target and further by disabling the near field communication due to the excessively far distance between the initiator and the target. In this case, similarly to the target released by the command RLS_REQ, the communicable state with the initiator between the target and the initiator is established by receiving and sending the polling request frame and the polling response frame.

Hereinbelow, complete release denotes the release of the target which is communicable with the initiator by receiving and sending the polling request frame and the polling response frame between the target and the initiator. Further, temporary release denotes the release of the target which is communicable with the initiator again only by receiving and sending the polling request frame and the polling response frame between the target and the initiator.

After the processing in step S120, the processing sequence advances to step S121 whereupon the NFC communication device determines whether or not all the targets that recognize the NFCIDs in step S15 in FIG. 14 are completely released. When it is determined in step S121 that all the targets that recognize the NFCIDs in step S15 in FIG. 14 are not completely released, the processing sequence returns to step S99 in FIG. 18 whereupon the NFC communication device selects one new target device from completely non-released, that is, the targets temporarily released. Hereinafter, the similar processing is repeated.

When it is determined in step S121 that all the targets which recognize the NFCIDs are completely released, the processing ends.

In steps S116 and S117 in FIG. 19, the data is sent and received (exchanged) between the target and the initiator by receiving and sending the command DEP_REQ and the response DEP_RES. One transaction indicates the reception and transmission of the command DEL_REQ and the response DEP_RES. After the processing in steps S116 and S117, the processing sequence returns to step S114 via steps S118, S111, S112, and S113, thus changing the communication parameter. Therefore, the communication parameter such as the transfer rate on the communication between the target and the initiator can be changed every transaction.

In steps S112 and S113, the command PSL_REQ and the response PSL_RES are received and sent between the initiator and the target. In step S114, the communication mode between the initiator and the target serving as one communication parameter can be changed. Therefore, the communication mode between the target and the initiator can be changed every transaction. This means that the communication mode between the target and the initiator must not be changed for one transaction.

Figure 20:
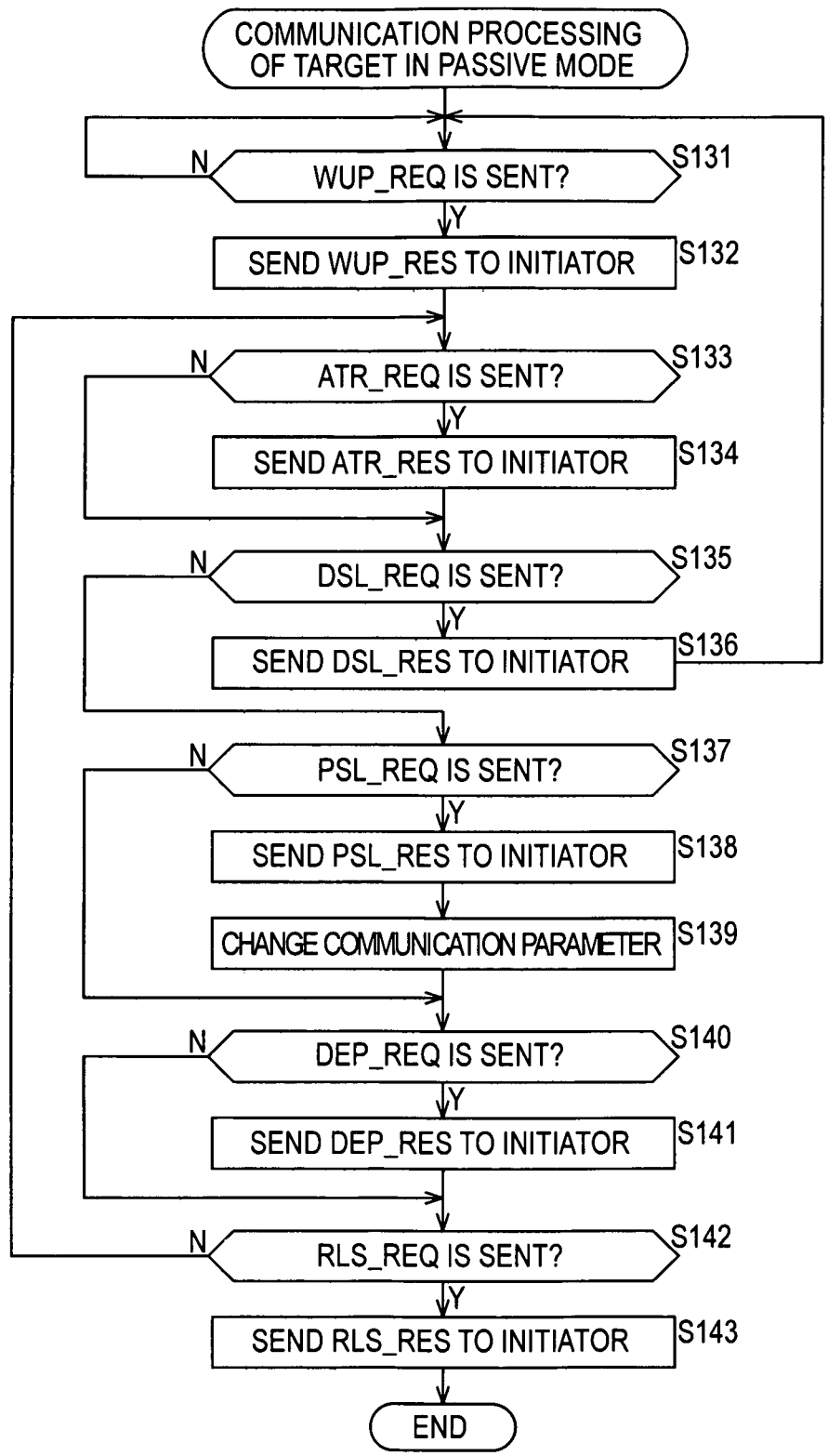
FIG. 20 is a flowchart showing communication processing of the target in the passive mode.

Next, a description is given of the communication processing of the target in the passive mode in step S38 in FIG. 15 with reference to a flowchart of FIG. 20.

In steps S37 and S38 in FIG. 15, the NFC communication device serving as the target in the passive mode the command DSL_REQ and the response DSL_RES to/from the initiator in the passive mode, thereby being in the deselecting state.

In step S131, the NFC communication device determines whether or not the initiator sends the command WUP_REQ. When it is determined in step S131 that the initiator does not send the command WUP_REQ, the processing sequence returns to step S131 whereupon the deselecting state is kept.

When it is determined in step S131 that the initiator sends the command WUP_REQ, that is, when the NFC communication device receives the command WUP_REQ, the processing sequence advances to step S131 whereupon the NFC communication device sends the response WUP_RES for the command WUP_REQ and is waken up. Then, the processing sequence advances to step S133.

In step S133, the NFC communication device determines the initiator sends the command ATR_REQ. When it is determined in step S133 that the initiator does not send the command ATR_REQ, step S134 is skipped and then the processing sequence advances to step S135.

When it is determined in step S133 that the initiator sends the command ATR_REQ, that is, when the NFC communication device receives the command ATR_REQ, the processing sequence advances to step S135 whereupon the NFC communication device sends the response ATR_RES for the command ATR_REQ and then the processing sequence advances to step S135.

In step S135, the NFC communication device determines whether or not the initiator sends the command DSL_REQ. When it is determined in step S135 that the initiator sends the command DSL_REQ, that is, when the NFC communication device receives the command DSL_REQ, the processing sequence advances to step S136 whereupon the NFC communication device sends the response DSL_RES for the command DSL_REQ. Then, the processing sequence returns to step S131. Thus, the NFC communication device is in the deselecting state.

When it is determined in step S135 that the initiator does not send the command DSL_REQ, the processing sequence advances to step S137 whereupon the NFC communication device determines whether or not the initiator sends the command PSL_REQ. When it is determined in step S137 that the initiator does not sent the command PSL_REQ, steps S138 and S139 are skipped and then the processing sequence advances to step S140.

When it is determined in step S137 that the initiator sends the command PSL_REQ, that is, when the NFC communication device receives the command PSL_REQ, the processing sequence advances to step S138 whereupon the NFC communication device sends the response PSL_RES for the command PSL_REQ. Then, the processing sequence advances to step S139. In step S139, the NFC communication device changes the communication parameter in accordance with the command PSL_REQ from the initiator. Then, the processing sequence advances to step S140.

In step S140, the NFC communication device determines whether or not the initiator sends the command DEP_REQ. When it is determined in step S140 that the initiator does not send the command DEP_REQ, step S141 is skipped and then the processing sequence advances to step S142.

When it is determined in step S140 that the initiator sends the command DEP_REQ, that is, when the NFC communication device receives the command DEP_REQ, the processing sequence advances to step S141 whereupon the NFC communication device sends the response DEP_RES for the command DEP_REQ. Then the processing sequence advances to step S142.

In step S142, the NFC communication device determines whether or not the initiator sends the command RSL_REQ. When it is determined in step S142 that the initiator does not send the command RSL_REQ, the processing sequence returns to step S133 and the similar processing is repeated.

When it is determined in step S142 that the initiator sends the command RSL_REQ, that is, when the NFC communication device receives the command RSL_REQ, the processing sequence advances to step S143 whereupon the NFC communication device sends the response RSL_RES for the command RSL_REQ. Thus, the communication with the initiator completely ends and the processing ends.

Figure 21:
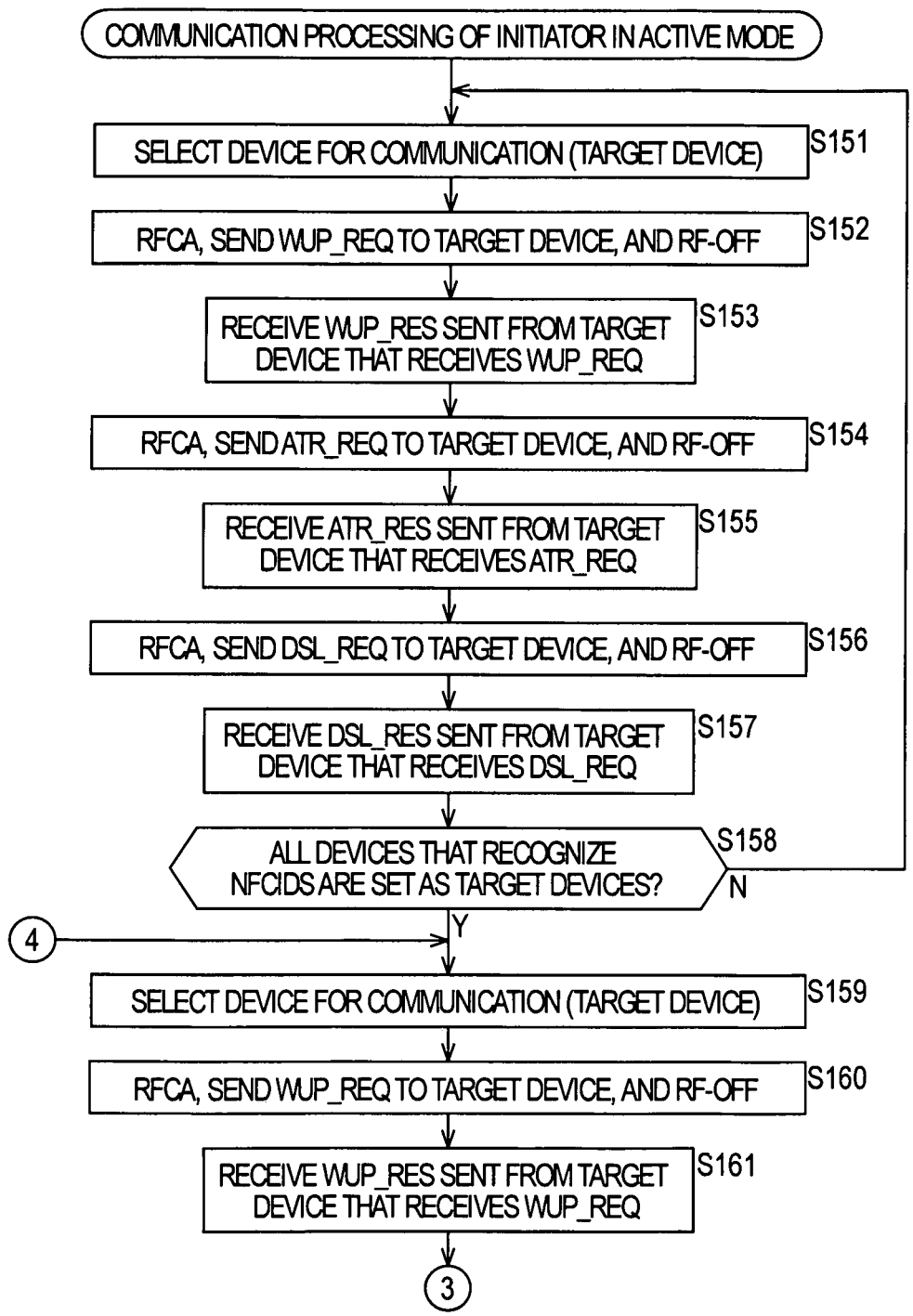
FIG. 21 is a flowchart showing communication processing of the initiator in the active mode.
Figure 22:
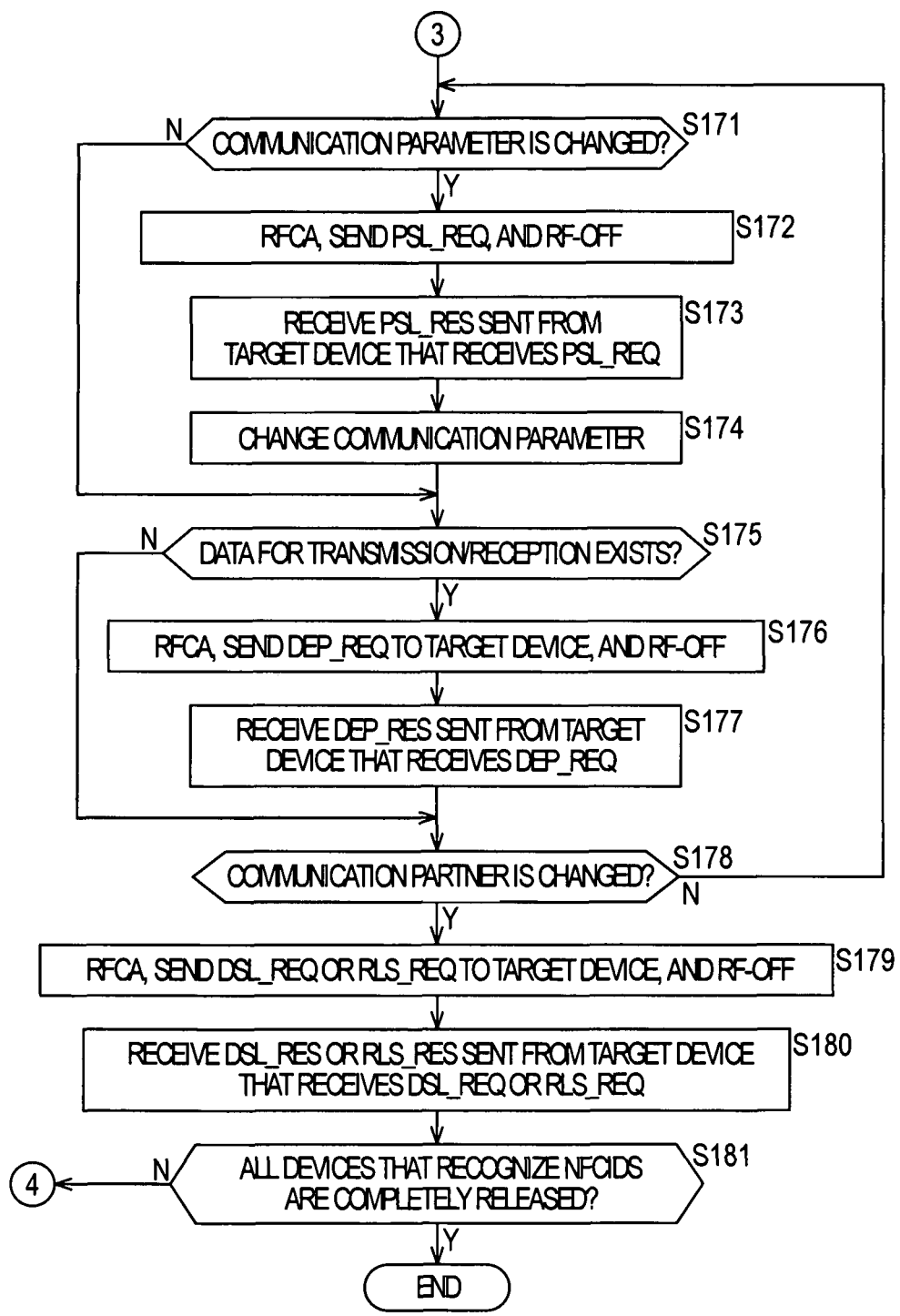
FIG. 22 is a flowchart showing communication processing of the initiator in the active mode.

Next, FIGS. 21 and 22 are flowcharts specifically showing the communication processing of the initiator in the active mode in step S61 in FIG. 16.

In the communication processing of the initiator in the passive mode described with reference to FIGS. 18 and 19, the initiator continuously outputs the electromagnetic wave. However, in the communication processing of the initiator in the active mode in FIGS. 21 and 22, before sending the command, the initiator performs the active RFCA processing and thus the output of electromagnetic wave starts. After ending the transmission of the command, the processing (off processing) for stopping the output of the electromagnetic wave is executed. Except for this, the communication processing of the initiator in the active mode in steps S151 to S161 in FIG. 21 is similar to the processing in steps S171 to S181 in FIG. 22, steps in S91 to S101 in FIG. 18, and steps S111 to S121 in FIG. 19. Thus, a description thereof is omitted.

Figure 23:
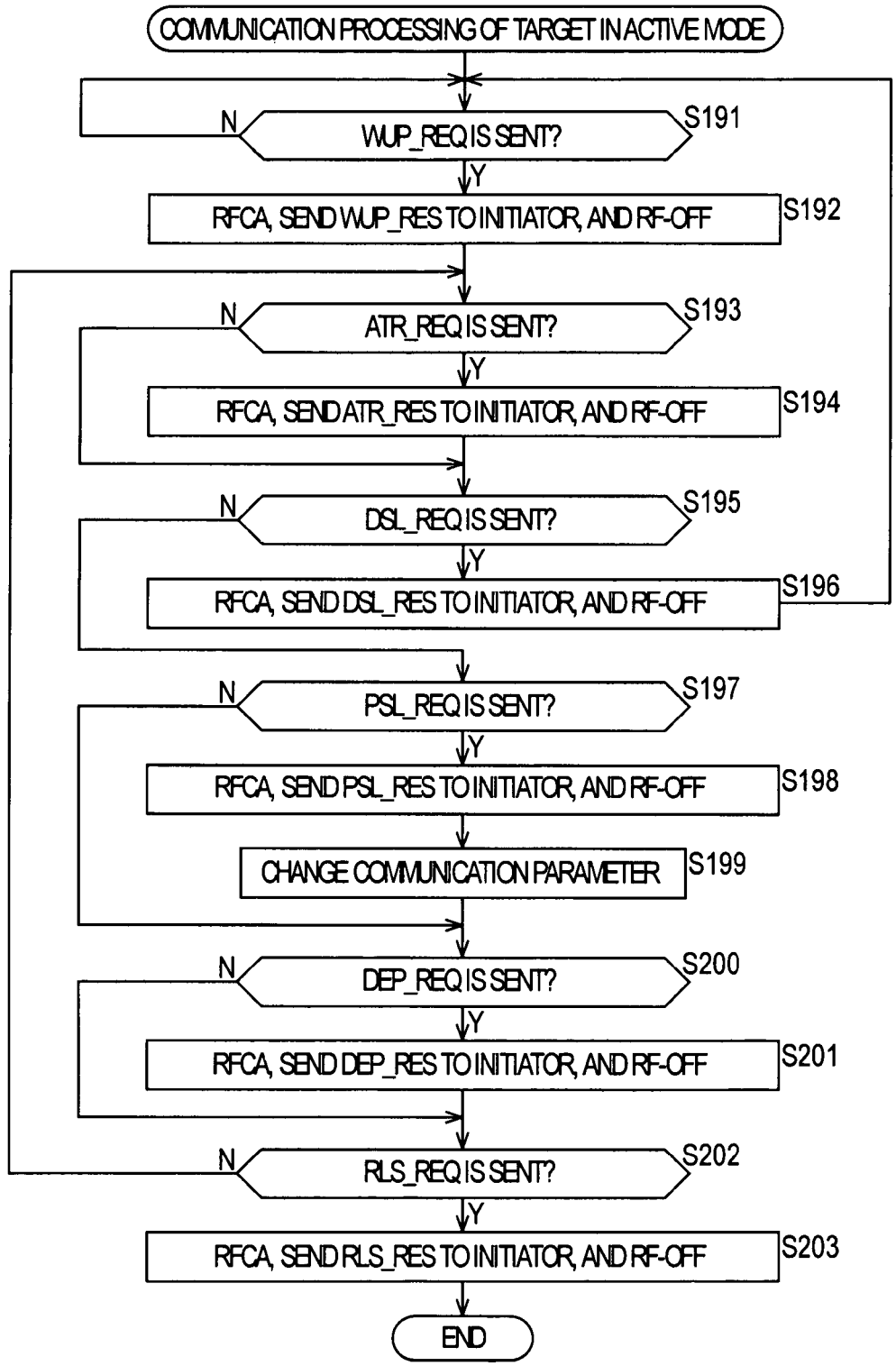
FIG. 23 is a flowchart of communication processing of the target in the active mode.

FIG. 23 is a flowchart specifically showing the communication processing of the target in the active mode in step S79 in FIG. 17.

In the communication processing of the target in the passive mode described with reference to FIG. 20, the target modulates the load of the electromagnetic wave outputted by the initiator. However, in the communication processing in the active mode in FIG. 23, before sending the command, the target performs the active RFCA processing, thereby starting the output of electromagnetic wave. After ending the transmission of the command, processing (off processing) for stopping the output of electromagnetic wave is performed. Except for this, the communication processing of the target in the active mode in steps S191 to S203 in FIG. 23 is similar to the processing and in steps S131 to S143 in FIG. 20 and therefore a description thereof is omitted.

Figure 24:
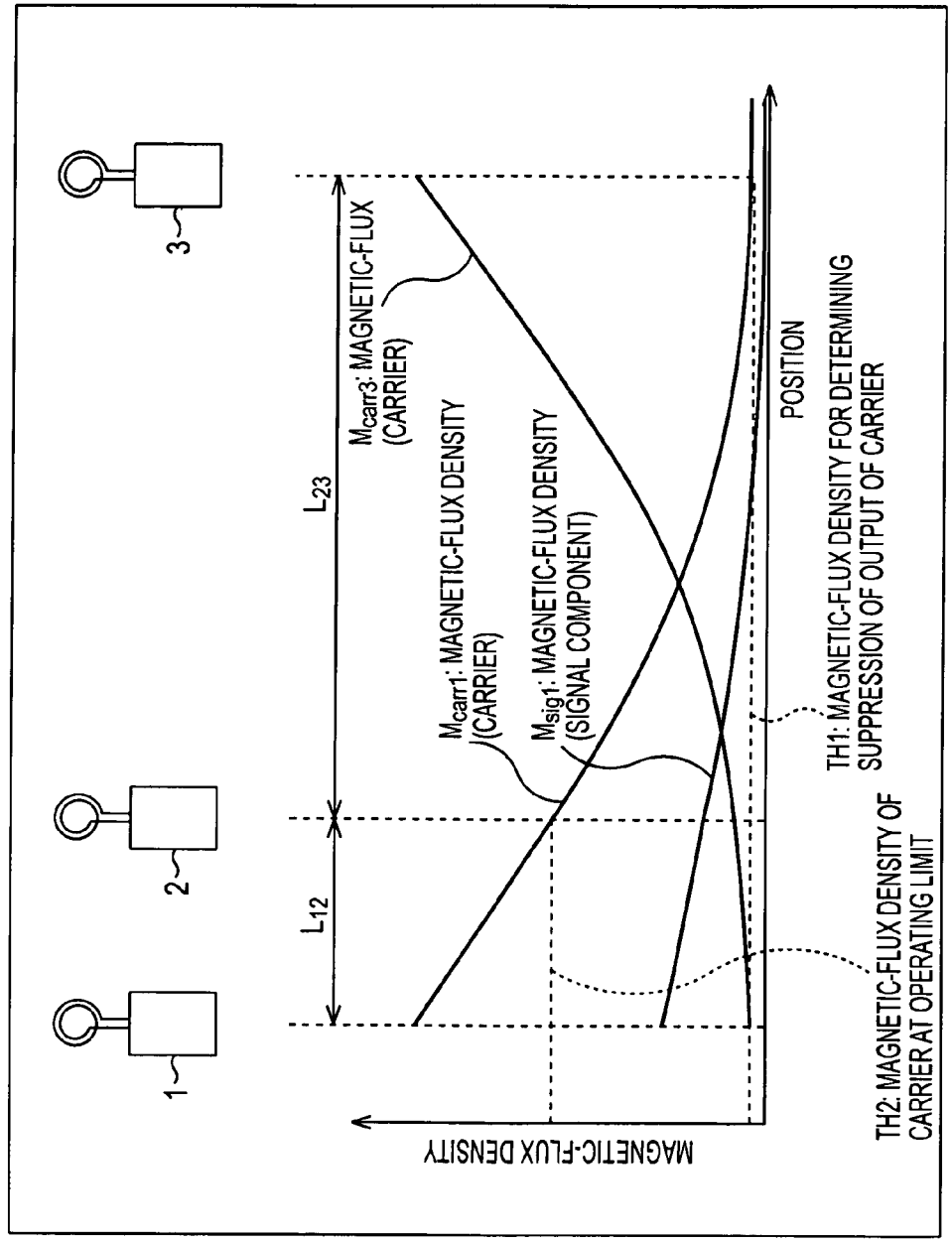
FIG. 24 is an explanatory diagram of one example of processing for coping with the problem of the hidden terminal.
Figure 25:
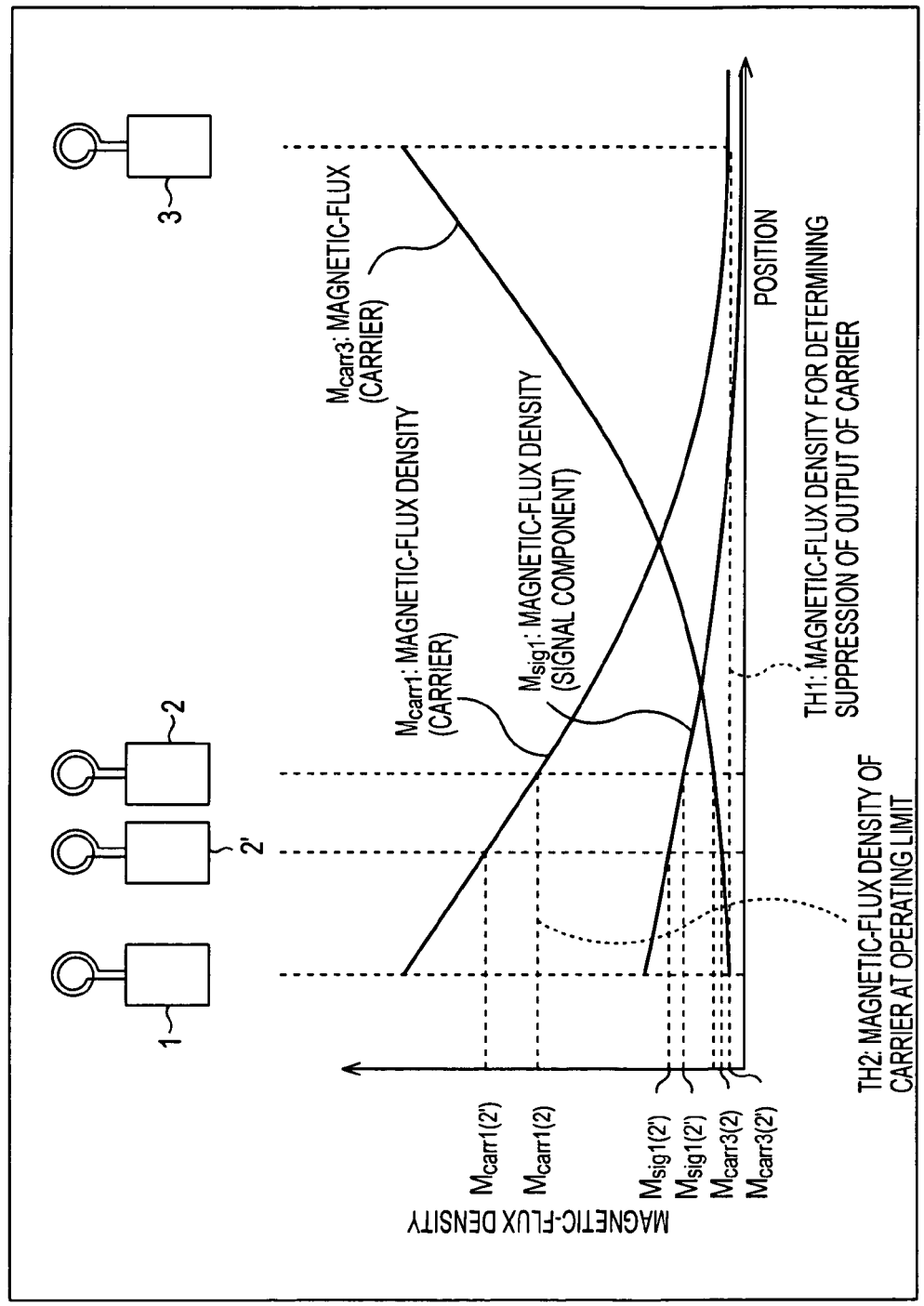
FIG. 25 is an explanatory diagram of another example of processing for coping with the problem of the hidden terminal.
Figure 26:
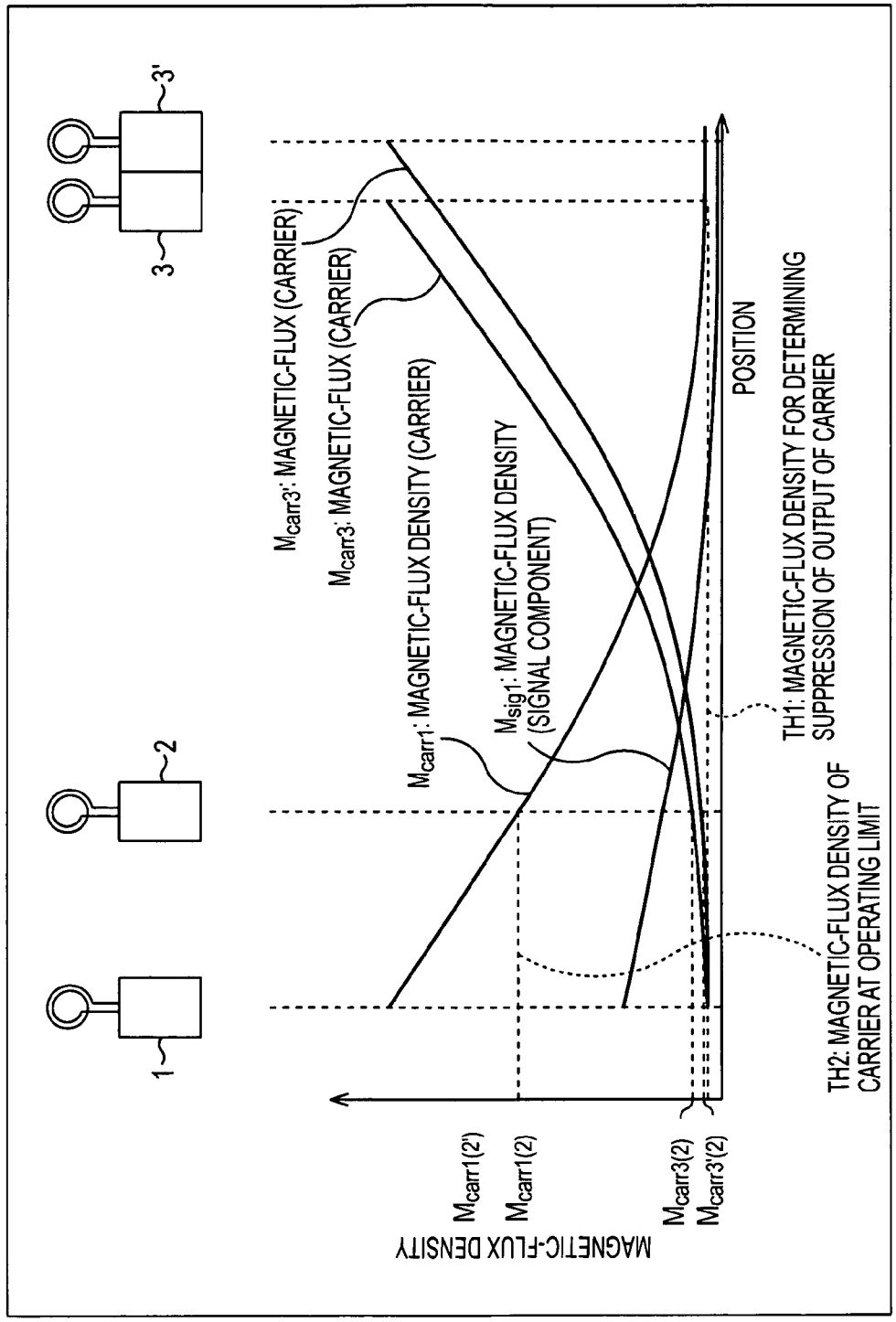
FIG. 26 is an explanatory diagram of another example of processing for coping with the problem of the hidden terminal.

Next, a description is given of a solving method of the problem of the hidden terminal in the NFC communication device with reference to FIGS. 24 to 26.

FIG. 24 shows a relationship between positions of three NFC communication devices 1, 2, and 3 and levels of the electromagnetic wave, that is, the levels of the magnetic flux of the electromagnetic wave.

Referring to FIG. 24, the NFC communication device 2 is apart from the NFC communication device 1 by a short distance $L_{12}$. The NFC communication device 3 is apart from the NFC communication device 2 by a distance $L_{23}$ longer than the distance $L_{12}$. The NFC communication devices 1 and 3 are apart from each other by a distance ($L_{12}+L_{23}$).

The NFC communication devices 1 to 3 receive and send the data to the communication partners by the transformer connection of the coils as the antennas 11 shown in FIG. 4. The communication partner of the NFC communication device is not only the NFC communication device but also the conventional IC card. However, when the communication partner, such as the conventional IC card, of the NFC communication device needs the power supply, the NFC communication device receives and sends the data and supplies the power by the transformer connection.

The power generated by the transformer connection of the coils is higher as the coils are close to each other, and is attenuated in inproportional to the third power of the distance between the coils.

The density of magnetic flux of the electromagnetic wave outputted by the NFC communication device 1 is monotoneously reduced in inproportional to approximately the third power of the distance from the NFC communication device 1. The density of magnetic flux of the electromagnetic wave outputted by the NFC communication device 1 is divided into a carrier component $M_{carr1}$ and a signal component $M_{sig1}$ serving as the amount of modulation of the sent data. As shown in FIG. 24, the carrier component $M_{carr1}$ and the signal component $M_{sig1}$ of the carrier component are attenuated in inproportional to approximately the third power of the distance from the NFC communication device 1.

Similarly, the densities of magnetic fluxes of the electromagnetic waves outputted by the NFC communication devices 2 and 3 are attenuated in inproportional to approximately the third power of the distance from the NFC communication devices 2 and 3, respectively. Incidentally, referring to FIG. 24 (similarly to FIGS. 25 and 26 which will be described later), the density of magnetic flux of the electromagnetic wave outputted by the NFC communication device 2 is not shown. In the density of magnetic flux of the electromagnetic wave outputted by the NFC communication device 3, only a carrier component $M_{carr3}$ is shown and the signal component is not shown.

The NFC communication devices 1 to 3 are designed so that the operation for obtaining the data by the demodulating unit 13 shown in FIG. 4 needs the carrier component that is equal to a magnetic-flux density TH2 or more of the carrier at the operating limit, serving as a predetermined threshold.

For example, it is assumed that, for communication, the NFC communication device 1 is on the sending side and the NFC communication device 2 is on the receiving side. Then, referring to FIG. 24, the NFC communication device 2 on the receiving side is apart from the NFC communication device 1 by the distance $L_{12}$ by which the carrier component $M_{carr1}$ of the electromagnetic wave outputted by the NFC communication device 1 on the sending side matches the magnetic-flux density TH2 of the carrier at the operating limit, and the NFC communication device 2 is the farthest from the NFC communication device 1 for communication.

When the distance between the NFC communication devices 1 and 2 is longer than the distance $L_{12}$, the carrier component $M_{carr1}$ of the electromagnetic wave from the NFC communication device 1, which is received by the NFC communication device 2, is lower than the magnetic-flux density TH2 of the carrier at the operating limit. Therefore, the NFC communication device 2 cannot receive the data sent from the NFC communication device 1. In this case, the magnetic-flux density TH2 of the carrier at the operating limit limits the distance for communication between the NFC communication devices 1 and 2 to be the distance $L_{12}$ or less.

In order to use the carrier component having the magnetic-flux density TH2 or more of the carrier at the operating limit, serving as the threshold in the case of obtaining the data by the demodulating unit 13 (FIG. 4) in the NFC communication device 2, a first method and a second method can be used. That is, according to the first method, the demodulating unit 13 is operated only when the demodulating unit 13 receives, via the antenna 11 and the receiving unit 12, the carrier component having the magnetic-flux density TH2 or more of the carrier at the operating limit. Further, according to the second method, the demodulating unit 13 is operated only when the detecting unit 23 detects the carrier component having the magnetic-flux density TH2 or more of the carrier at the operating limit. According to the second method, the threshold setting unit 24 shown in FIG. 4 sets, as a threshold, the magnetic-flux density TH2 of the carrier at the operating limit. The detecting unit 23 detects the electromagnetic wave at the level of the magnetic-flux density TH2 or more of the carrier at the operating limit, serving as the threshold.

As mentioned above, the NFC communication devices 1 to 3 are designed to need the carrier component at the level of the magnetic-flux density TH2 or more of the carrier at the operating limit, serving as the threshold, so as to obtain the data by the demodulating unit 13. Further, the NFC communication devices 1 to 3 are designed to start the output of the electromagnetic wave when the detecting unit 23 (FIG. 4) does not detect the carrier component at the level of the magnetic-flux density TH1 or more for determining the suppression of the output of carrier, serving as another threshold.

As described with reference to FIGS. 9 and 10, the electromagnetic wave is not detected around the NFC communication devices 1 to 3, the NFC communication devices 1 to 3 perform the RFCA processing for starting the outputs of the electromagnetic waves. When the electromagnetic wave is not detected in the RFCA processing, the carrier component at the level of the magnetic-flux density TH1 or more for determining the suppression of the output of carrier is not detected.

Referring to FIG. 24, the NFC communication device 1 is apart from the NFC communication device 3 that is not the communication partner by the distance $(L_{12}+L_{23})$ when the carrier component $M_{carr3}$ of the electromagnetic wave outputted by the NFC communication device 3 is less than the magnetic-flux density TH1 for determining suppression of output of carrier in the NFC communication device 1 (shortest distance between the NFC communication devices 1 and 3, by which both the NFC communication devices 1 and 3 simultaneously output the electromagnetic waves). In this case, the output of the electromagnetic wave by the NFC communication device 1 is not prevented by the output of the electromagnetic wave by the NFC communication device 3.

The NFC communication devices 1 and 3 are apart from each other by the distance $(L_{12}+L_{23})$ when the carrier component $M_{carr3}$ of the electromagnetic wave outputted by the NFC communication device 3 is less than the magnetic-flux density TH1 for determining suppression of output of carrier in the NFC communication device 1. Then, the carrier component $M_{carr1}$ outputted by the NFC communication device 1 is attenuated to be less than the magnetic-flux density TH1 for determining suppression of output of carrier in the NFC communication device 3. Therefore, the output of the electromagnetic wave of the NFC communication device 3 is not prevented by the output of the electromagnetic wave of the NFC communication device 1. Here, the levels of the electromagnetic waves outputted by the communication devices 1 to 3 are similar.

As mentioned above, referring to FIG. 24, both the NFC communication device 1 in the communication with the NFC communication device 2 and the NFC communication device 3 in the non-communication with the NFC communication device 2 can output the electromagnetic waves. The NFC communication device 2 is near the NFC communication device 3, rather than the NFC communication device 1. Further, the NFC communication device 2 is near the NFC communication device 1, rather than the NFC communication device 3. The electromagnetic wave from the NFC communication device 3 is received at the level higher than that of the NFC communication device 1. The electromagnetic wave from the NFC communication device 1 is received at the level higher than that of the NFC communication device 3.

Now, the communication is established between the NFC communication devices 1 and 2. When the electromagnetic wave received by the NFC communication device 2 from the NFC communication device 1 is influenced from the electromagnetic wave received by the NFC communication device 2 from the NFC communication device 3, the NFC communication device 2 normally does not receive the data from the NFC communication device 1 serving as the communication partner. The electromagnetic wave from the NFC communication device 3 prevents the communication between the NFC communication devices 1 and 2.

The magnetic-flux density TH2 of the carrier at the operating limit is higher than the magnetic-flux density TH1 for determining the suppression of the output of carrier. Thus, the signal component $M_{sig1}$ of the electromagnetic wave received by the NFC communication device 2 from the NFC communication device 1 is set to a value that is not influenced from the carrier component $M_{carr3}$ of the electromagnetic wave received by the NFC communication device 2 from the NFC communication device 3.

As mentioned above, when the distance between the NFC communication devices 1 and 3 is the distance $(L_{12}+L_{23})$ by which the carrier component $M_{carr3}$ outputted from the NFC communication device 3 is attenuated to be less than the magnetic-flux density TH1 for determining the suppression of the output of carrier in the communication device 1, the minimum level of the carrier component for obtaining the signal component that is not influenced from the carrier component $M_{carr3}$ of the NFC communication device 3 in the NFC communication device 2 is the magnetic-flux density TH2 of the carrier at the operating limit. In order to obtain the data from the NFC communication device 1 in the NFC communication device 2, the carrier component $M_{carr1}$ of the electromagnetic wave outputted by the NFC communication device 1 needs to have the magnetic-flux density TH2 or more of the carrier at the operating limit. Thus, in the NFC communication device 2, the output of the electromagnetic wave by the NFC communication device 3 that is not the communication partner, thereby preventing the normal reception of the data having the signal component $M_{sig1}$ sent from the NFC communication device 1, that is, the problem of the hidden terminal is solved.

That is, referring to FIG. 24, irrespective of the output of the electromagnetic wave of the NFC communication device 1, it is possible to output the electromagnetic wave by the NFC communication device 3 at the position where the carrier component $M_{carr1}$ of the electromagnetic wave from the NFC communication device 1 is less than the magnetic-flux density TH1 for determining the suppression of the output of carrier. That is, both the NFC communication devices 1 and 3 simultaneously output the electromagnetic waves.

Referring to FIG. 24, the NFC communication device 2 receives the carrier component $M_{carr1}$ having the magnetic-flux density TH2 of the carrier at the operating limit from the NFC communication device 1, and further receives the carrier component $M_{carr3}$ lower than the magnetic-flux density TH2 of the carrier at the operating limit from the NFC communication device 3. In order to obtain the data sent from another device, the NFC communication device 2 needs the carrier component having the magnetic-flux density TH2 or more of the carrier at the operating limit. Therefore, the NFC communication device 2 normally receives the data sent from the NFC communication device 1 but normally does not receive the data sent from the NFC communication device 3. Further, the NFC communication devices 1 and 3 are apart from each other by the distance $(L_{12}+L_{23})$ by which the carrier component $M_{carr3}$ of the electromagnetic wave outputted from the NFC communication device 3 is attenuated to be at the level of the magnetic-flux density TH1 for determining the suppression of the output of carrier in the NFC communication device 1. Therefore, depending on the determination of the magnetic-flux density TH2 of the carrier at the operating limit, the carrier component $M_{carr3}$ received by the NFC communication device 2 from the NFC communication device 3 does not influence on the signal component $M_{sig1}$ received by the NFC communication device 2 from the NFC communication device 1. Therefore, the NFC communication device 2 normally receives the data sent from the NFC communication device, irrespective of the output of the electromagnetic wave by the NFC communication device 3.

FIG. 25 shows the level of the electromagnetic wave when an NFC communication device 2' exists, in addition to the NFC communication devices 1 to 3 shown in FIG. 24.

The NFC communication device 2' is near the NFC communication device 1, rather than the NFC communication device 2, and is far from the NFC communication device 3, rather than the NFC communication device 2.

Hereinbelow, a carrier component $M_{carr\#i(\#j)}$ denotes a carrier component $M_{carr\#i}$ of the electromagnetic wave outputted by the NFC communication device #i, and a signal component $M_{sig\#i(\#j)}$ denotes level (density of magnetic flux) of the NFC communication device #j of the signal component $M_{sig\#i}$.

Referring to FIG. 25, in the communication between the NFC communication devices 1 and 2', the NFC communication device 2' is near the NFC communication device 1, rather than the NFC communication device 2. The carrier component $M_{carr1(2')}$ received by the NFC communication device 2' from the NFC communication device 1 is higher than the carrier component $M_{carr1(2)}$ received by the NFC communication device 2 from the NFC communication device 1. Therefore, the signal component $M_{sig1(2')}$ received by the NFC communication device 2' from the NFC communication device 1 is higher than the signal component $M_{sig1(2)}$ received by the NFC communication device 2 from the NFC communication device 1.

The NFC communication device 2' is apart from the NFC communication device 3, rather than the NFC communication device 2. The carrier component $M_{carr3(2')}$ received by the NFC communication device 2' from the NFC communication device 3 is lower than a carrier component $M_{carr3(2)}$ received by the NFC communication device 2 from the NFC communication device 3.

In the communication between the NFC communication devices 1 and 2, a ratio of the signal component $M_{sig1(2)}$ received by the NFC communication device 2 from the NFC communication device 1 to the carrier component $M_{carr3(2)}$ received by the NFC communication device 2 from the NFC communication device 3 becomes an S/N (Signal Noise) ratio. Similarly, in the communication between the NFC communication devices 1 and 2', a ratio of the signal component $M_{sig1(2')}$ received by the NFC communication device 2' from the NFC communication device 1 to the carrier component $M_{carr3(2')}$ received by the NFC communication device 2' from the NFC communication device 3 becomes an S/N ratio.

As mentioned above, the signal component $M_{sig1(2')}$ received by the NFC communication device 2' from the NFC communication device 1 is higher than the signal component $M_{sig1(2)}$ received by the NFC communication device 2 from the NFC communication device 1. The carrier component $M_{carr3(2')}$ received by the NFC communication device 2' from the NFC communication device 3 is lower than the carrier component $M_{carr3(2)}$ received by the NFC communication device 2 from the NFC communication device 3.

Therefore, the S/N ratio ($=M_{sig1(2')}/M_{carr3(2')}$) of the NFC communication device 2' is more preferable than the S/N ratio ($=M_{sig1(2)}/M_{carr3(2)}$) of the NFC communication device 2.

As mentioned above, the NFC communication device 2' serving as the NFC communication device is near the NFC communication device 1, rather than the NFC communication device 2, and is far from the NFC communication device 3, rather than the NFC communication device 2. Then, the problem of the hidden terminal is solved.

When the NFC communication device 2' is apart from the NFC communication device 1 rather than the NFC communication device 2, the carrier component $M_{carr1(2')}$ received by the NFC communication device 2' from the NFC communication device 1 is not equal to the magnetic-flux density TH2 or more of the carrier at the operating limit. In this case, the communication between the communication devices 1 and 2' is not established and therefore the problem of the hidden terminal is not caused.

FIG. 26 shows the level of the electromagnetic wave when an NFC communication device 3' exists in addition to the NFC communication devices 1 to 3 shown in FIG. 24.

The NFC communication device 3' is apart from the NFC communication devices 1 and 2, rather than the NFC communication device 3.

The carrier component $M_{carr1}$ of the electromagnetic wave outputted by the NFC communication device 1 is attenuated to be at the level lower than the level of the magnetic-flux density TH1 for determining the suppression of the output of carrier at the position of the NFC communication device 3'. The carrier component $M_{carr3'}$ of the electromagnetic wave outputted by the NFC communication device 31 is attenuated to be at the level lower than that of the magnetic-flux density TH1 for determining the suppression of the output of carrier at the position of the NFC communication device 1. Similarly to the case of the NFC communication devices 1 and 3 shown in FIG. 24, both the NFC communication devices 1 and 3' simultaneously output the electromagnetic waves.

The NFC communication device 3' is apart from the NFC communication devices 1 and 2, rather than the NFC communication device 3. The carrier component $M_{carr3'(2)}$ received by the NFC communication device 2 from the NFC communication device 3' is lower than the carrier component $M_{carr3(2)}$ received by the NFC communication device 2 from the NFC communication device 3.

In the communication of the NFC communication device 2 with the NFC communication device 1, the electromagnetic wave outputted by the NFC communication device 3 or 3' is equal to the noises. As mentioned above, the carrier component $M_{carr3'(2)}$ received by the NFC communication device 2 from the NFC communication device 3' is lower than the carrier component $M_{carr3(2)}$ received by the NFC communication device 2 from the NFC communication device 3.

Therefore, in the case of the S/N ratio of the communication of the NFC communication device 2 with the NFC communication device 1, the S/N ratio ($=M_{sig1(2)}/M_{carr3'(2)}$) in the case of outputting the electric waves by the NFC communication device 3' is more preferable than the S/N ratio ($=M_{sig1(2)}/M_{carr3(2)}$) in the case of outputting the NFC communication device 3.

As mentioned above, when the NFC communication device 3' that is not the communication partner is apart from the NFC communication devices 1 and 2 for communication rather than the NFC communication device 3, the problem of the hidden terminal is solved.

When the NFC communication device 3' is near the NFC communication device 1, rather than the NFC communication device 3, the carrier component $M_{carr1}$ of the electromagnetic wave outputted by the NFC communication device 1 reaches the NFC communication device 3' at the level of the magnetic-flux density TH1 or more for determining the suppression of the output of carrier. In this case, the NFC communication device 3' does not output the electromagnetic wave and therefore the problem of the hidden terminal is not caused.

In the above case, the NFC communication device 1 outputs the electromagnetic wave so that the NFC communication device 2 sends the data and the NFC communication device 2 receives the data. Further, when the NFC communication device 2 sends the data to the NFC communication device 1 and the NFC communication device 1 receives the data, the NFC communication device 3 outputs the electromagnetic wave and thus it is possible to prevent the data reception of the NFC communication device 1, that is, the problem of the hidden terminal is solved.

When the NFC communication device 2 is the initiator in the passive mode or communicates the data in the active mode, the NFC communication device 2 outputs the electromagnetic wave by itself and sends the data. When the NFC communication device 2 near the NFC communication device 3 rather than the NFC determined device 1 outputs the electromagnetic wave to the NFC communication device 3, the NFC communication device 2 reaches the NFC communication device 3 at the level of the carrier component of the electromagnetic wave higher than that of the magnetic-flux density TH1 for determining the suppression of output of carrier. The NFC communication device 3 does not output the electromagnetic wave and the problem of the hidden terminal is not caused.

When the NFC communication device 2 is the target in the passive mode, the NFC communication device 2 modulates the load of the electromagnetic wave outputted by the NFC communication device 1 serving as the initiator in the passive mode and sends the electromagnetic wave to the NFC communication device 1. When the signal component that reaches the NFC communication device 1 by the load modulation is influenced from the electromagnetic wave outputted by the NFC communication device 3, the NFC communication device 1 does not receive the data sent from the NFC communication device 2.

On the contrary, when the NFC communication devices 1 and 3 are apart from each other by the distance ($L_{12}+L_{23}$) by which the carrier component $M_{carr3}$ of the electromagnetic wave outputted by the NFC communication device 3 (1) is less than the magnetic-flux density TH1 for determining the suppression of the output of carrier, the data sent from the NFC communication device 2 is received by receiving, in the NFC communication device 1, the signal component as a result of the load modulation of the NFC communication device 2 which is not influenced from the carrier component $M_{carr3}$ of the NFC communication device 3.

As mentioned above, the load modulation ratio of the load modulation of the NFC communication device 2 is set so as to set, to be sufficiently higher, the S/N ratio of the signal component that reaches to the NFC communication device 1 by the load modulation of the NFC communication device 2 to the electromagnetic wave outputted by the NFC communication device 3 by the load modulation. Then, when the NFC communication devices 1 and 3 are apart from each other by the distance ($L_{12}+L_{23}$) by which the carrier component $M_{carr3}$ of the electromagnetic wave outputted by the NFC communication device 3 (1) is less than the magnetic-flux density TH1 for determining the suppression of the output of carrier, the carrier component $M_{carr1}$ of the electromagnetic wave outputted by the NFC communication device 1 in the NFC communication device 2 is the magnetic-flux density TH2 of the carrier at the operating limit to ensure the minimum S/N ratio to normally receive the data from the NFC communication device 2 by the NFC communication device 1 without any influence from the electromagnetic wave from the NFC communication device 3 and the problem of the hidden terminal is solved.

Next, a description is given of control processing (processing for controlling the reception and transmission) of the data when the problem of the hidden terminal is solved and the data is received and sent as mentioned above with reference to FIGS. 24 to 26. The processing for controlling the reception and the transmission is performed by the control unit 21 shown in FIG. 4.

Figure 27:
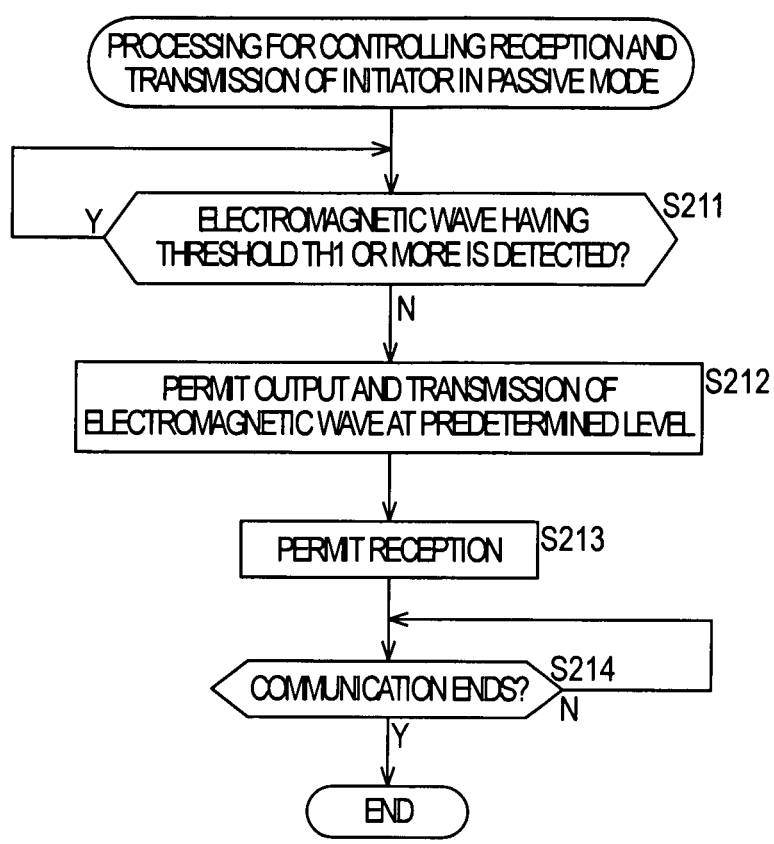
FIG. 27 is a flowchart showing processing for controlling the reception and transmission of the initiator in the passive mode.

A description is given of the processing for controlling the reception and transmission of the initiator in the passive mode when the NFC communication device becomes the initiator in the passive mode with reference to a flowchart of FIG. 27.

In step S211, the control unit 21 (FIG. 4) determines whether or not the detecting unit 23 detects the electromagnetic wave at the level of the magnetic-flux density TH1 or more for determining the suppression of the output of carrier. When it is determined in step S211 that the detecting unit 23 detects the electromagnetic wave at the level of the magnetic-flux density TH1 or more for determining the suppression of the output of carrier, the processing sequence returns to step S211. That is, when the electromagnetic wave at the level of the magnetic-flux density TH1 or more for determining the suppression of the output of carrier is detected, the electromagnetic wave is not outputted. Therefore, the determination as whether or not the electromagnetic wave at the level of the magnetic-flux density TH1 or more for determining the suppression of the output of carrier is detected is continued. In the processing in step S211, the threshold setting unit 24 sets the threshold supplied to the detecting unit 23 to the magnetic-flux density TH1 for determining the suppression of the output of carrier, and supplies the set threshold to the detecting unit 23.

When it is determined in step S211 that the electromagnetic wave at the level of the magnetic-flux density TH1 or more for determining the suppression of the output of carrier is not detected, the processing sequence advances to step S212 whereupon the control unit 21 permits the output of the electromagnetic wave by the electromagnetic-wave output unit 18 and the data transmission by modulating the electromagnetic wave. Then, the processing sequence advances to step S213. Thus, the electromagnetic-wave output unit 18 starts to output the electromagnetic wave and the modulating unit 19 enters a state for modulating the electromagnetic wave. As mentioned above, the initiator in the passive mode continuously output the electromagnetic wave until the communication with the target ends.

In step S213, the control unit 21 allows the demodulating unit 13 of the reception and demodulation of the data sent by modulating the load of the electromagnetic wave outputted by itself by the target in the passive mode, and the processing sequence advances to step S214. Thus, the demodulating unit 13 starts to demodulate the data sent by modulating the load of the electromagnetic wave outputted by the initiator in the passive mode by the target in the passive mode.

Then, the processing sequence advances to step S214 whereupon the control unit 21 determines whether or not the communication with the target in the passive mode completely ends. When it is determined in step S214 that the communication with the target in the passive mode completely does not end, the processing sequence returns to step S214. When it is determined in step S214 that, the control unit 21 prohibits the output of electromagnetic wave by the electromagnetic-wave output unit 18, the data transmission by modulating the electromagnetic wave, and the data reception by the demodulating the electromagnetic wave load-modulated, and the processing ends.

Figure 28:
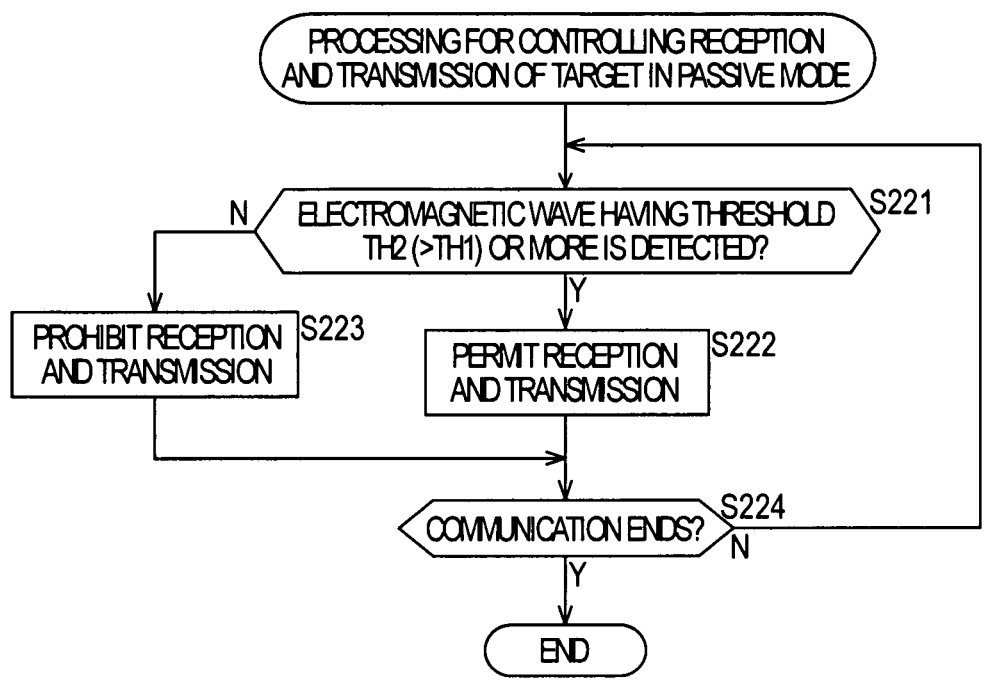
FIG. 28 is a flowchart showing processing for controlling the reception and transmission of the target in the passive mode.

Next, a description is given of the processing for controlling the reception and transmission of the target in the passive mode when the NFC communication device becomes the target in the passive mode with reference to a flowchart of FIG. 28.

In step S221, the control unit 21 (FIG. 4) determines whether or not the detecting unit 23 detects the electromagnetic wave at the magnetic-flux density TH2 or more of the carrier at the operating limit. In the processing in step S221, the threshold setting unit 24 sets the threshold of the detecting unit 23 to the magnetic-flux density TH2 of the carrier at the operating limit, and supplies the threshold to the detecting unit 23.

When it is determined in step S221 that the detecting unit 23 detects the electromagnetic wave at the magnetic-flux density TH2 or more of the carrier at the operating limit, the processing sequence advances to step S222 whereupon the control unit 21 permits the data reception by demodulating the electromagnetic wave sent from the initiator in the passive mode and the data transmission by modulating the load of the electromagnetic wave, and the processing sequence advances to step S224. Thus, the load modulation unit 20 enters a state of modulating the load of the electromagnetic wave. The demodulating unit 13 starts to demodulate the electromagnetic wave outputted by the initiator in the passive mode.

When it is determined in step S221 that the detecting unit 23 does not detect the electromagnetic wave at the magnetic-flux density TH2 or more of the carrier at the operating limit, the processing sequence advances to step S223 whereupon the control unit 21 prohibits the data reception by demodulating the electromagnetic wave by the demodulating unit 13 and the data transmission by modulating the electromagnetic wave by the load modulation unit 20 and then the processing sequence advances to S224.

In step S224, the control unit 21 determines whether or not the communication with the initiator in the passive mode completely ends. When it is determined in step S224 that the communication with the initiator in the passive mode completely does not end, the processing sequence returns to step S221. When it is determined in step S221 that the communication with the initiator in the passive mode completely ends, the control unit 21 prohibits the data reception by demodulating the electromagnetic wave by the demodulating unit 13 and the data transmission by modulating the load of the electromagnetic wave by the load modulation unit 20, and the processing sequence ends.

Figure 29:
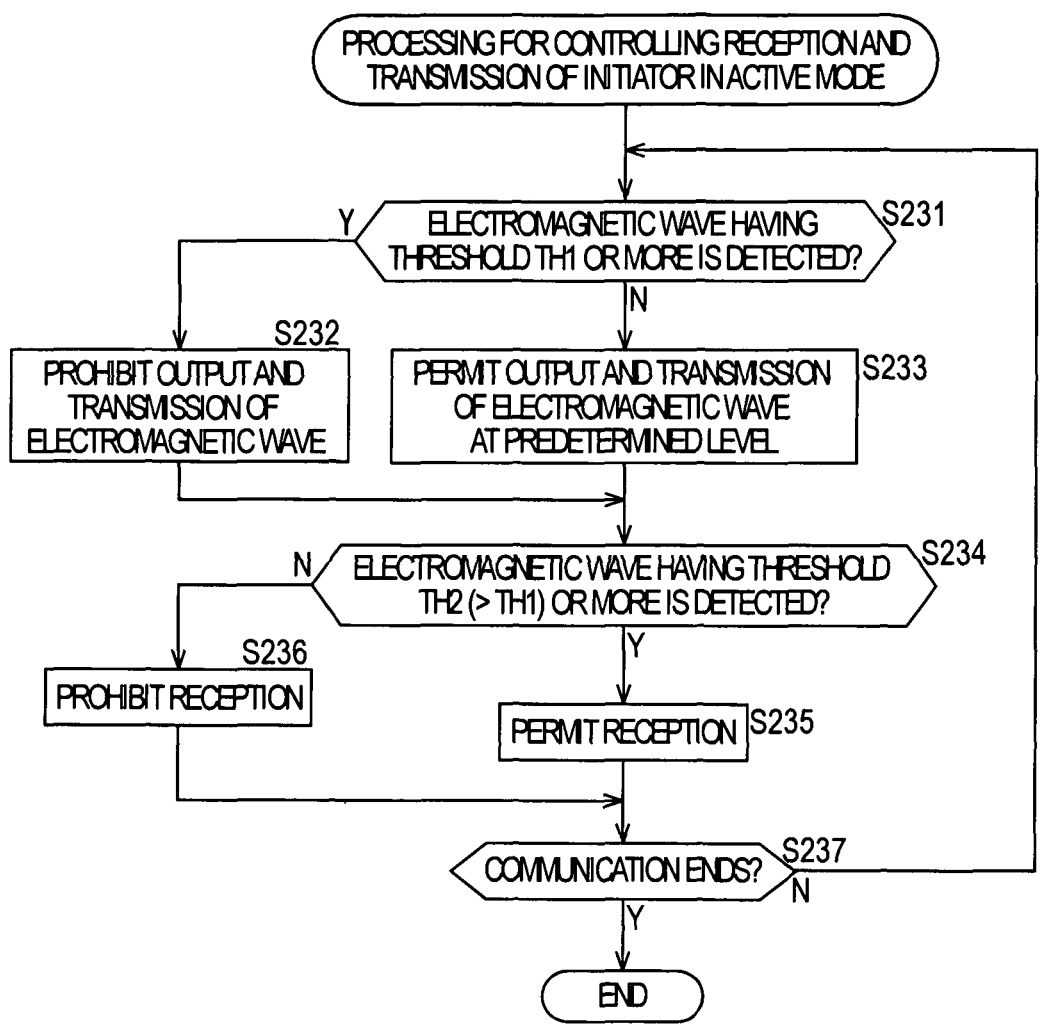
FIG. 29 is a flowchart showing processing for controlling the reception and transmission of the initiator in the active mode.

Next, a description is given of the processing for controlling the reception and transmission of the initiator in the active mode when the NFC communication device becomes the initiator in the active mode with reference to a flowchart of FIG. 29.

First, in step S231, the control unit 21 (FIG. 4) determines whether or not the detecting unit 23 detects the electromagnetic wave at the level of the magnetic-flux density TH1 or more for determining the suppression of the output of carrier. In the processing in step S231, the threshold setting unit 24 sets the threshold supplied to the detecting unit 23 to the magnetic-flux density TH1 for determining the suppression of the output of carrier, and supplies the threshold to the detecting unit 23.

When it is determined in step S231 that the detecting unit 23 detects the electromagnetic wave at the level of the magnetic-flux density TH1 or more for determining the suppression of the output of carrier, the processing sequence advances to step S232, the control unit 21 prohibits the output-of the electromagnetic wave by the electromagnetic-wave output unit 18 and the data transmission by modulating the electromagnetic wave by the modulating unit 19. Then, the processing sequence advances to step S234. That is, when the electromagnetic wave is at the level of the magnetic-flux density TH1 or more for determining the suppression of the output of carrier, the electromagnetic wave is outputted.

Therefore, the output of the electromagnetic wave and the data transmission of the electromagnetic wave are prohibited.

When it is determined in step S231 that the detecting unit 23 does not detect the electromagnetic wave at the level of the magnetic-flux density TH1 or more for determining the suppression of the output of carrier, the processing sequence advances to step S233 whereupon the control unit 21 permits the output of the electromagnetic wave and the data transmission by modulating the electromagnetic wave by the electromagnetic-wave output unit 18 and then the processing sequence advances to step S234. Thus, the electromagnetic-wave output unit 18 can start to output the electromagnetic wave and the modulating unit 19 can modulate the electromagnetic wave.

In step S234, the control unit 21 determines whether or not the detecting unit 23 detects the electromagnetic wave at the level of the magnetic-flux density TH2 or more of the carrier at the operating limit. In the processing in step S234, the threshold setting unit 24 sets the threshold supplied to the detecting unit 23 to the magnetic-flux density TH2 of the carrier at the operating limit, and supplies the threshold to the detecting unit 23.

When it is determined in step S234 that the detecting unit 23 detects the electromagnetic wave at the level of the magnetic-flux density TH2 or more of the carrier at the operating limit, the processing sequence advances to step S235 whereupon the control unit 21 permits the data reception by modulating the electromagnetic wave sent from the target in the active mode and then the processing sequence advances to step S237. Thus, the demodulating unit 13 can demodulate the electromagnetic wave outputted by the target in the active mode.

When it is determined in step S234 that the detecting unit 23 does not detect the electromagnetic wave at the level of the magnetic-flux density TH2 or more of the carrier at the operating limit, the processing sequence advances to step S236 whereupon the control unit 21 prohibits the data reception by demodulating the electromagnetic wave by the demodulating unit 13 and then the processing sequence advances to step S237.

In step S237, the control unit 21 determines whether or not the communication with the target in the active mode completely ends. When it is determined in step S237 that the communication with the target in the active mode completely does not end, the processing sequence returns to step S231. When it is determined in step S237 that the communication with the target in the active mode completely ends, the control unit 21 prohibits the output of the electromagnetic wave by the electromagnetic-wave output unit 18, the data reception by demodulating the electromagnetic wave by the demodulating unit 13, and the data transmission by modulating the electromagnetic wave by the modulating unit 19 and then the processing sequence ends.

Figure 30:
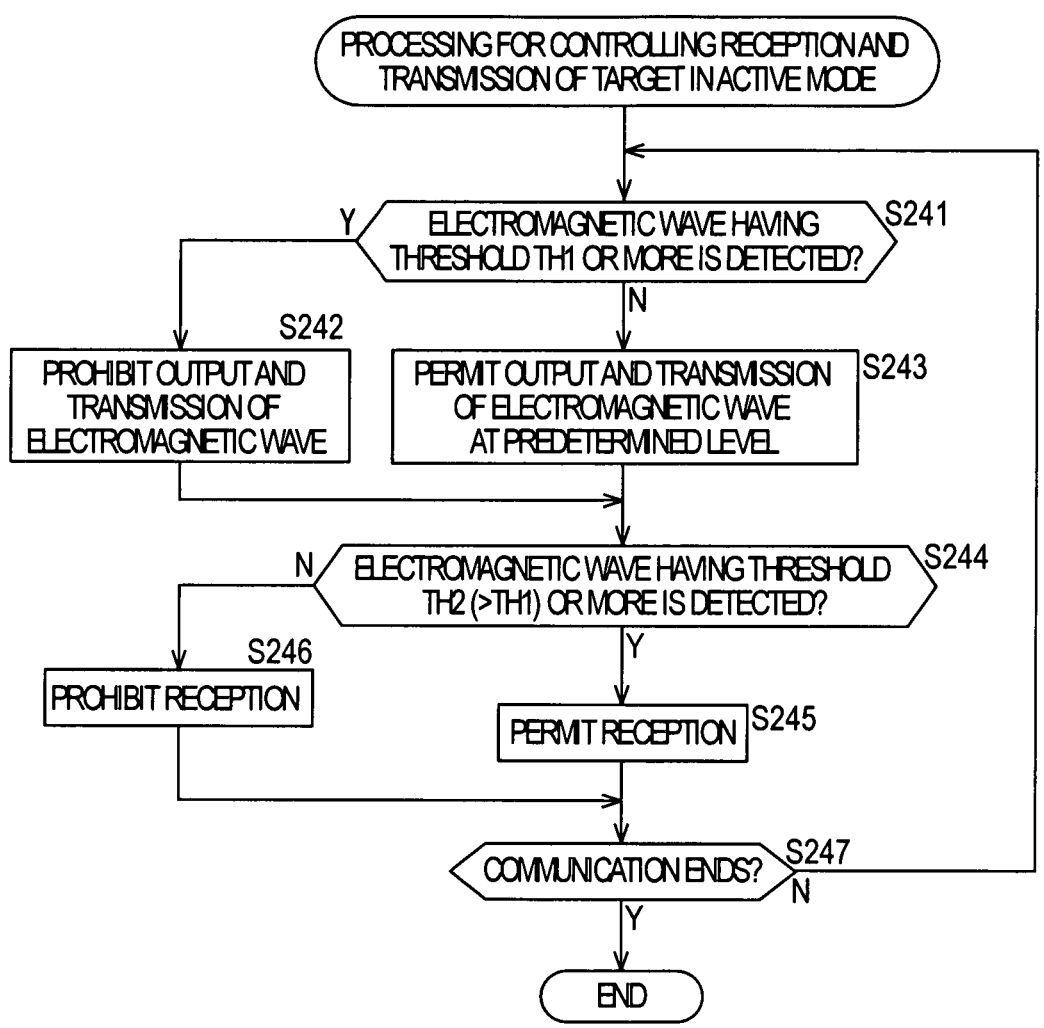
FIG. 30 is a flowchart showing processing for controlling the reception and transmission of the target in the active mode.

FIG. 30 shows a flowchart for describing the processing for controlling the reception and the transmission of the target in the active mode when the NFC communication device becomes the target in the active mode. The processing for controlling the reception and the transmission of the target in the active mode in steps S241 to S247 is the similar to that in steps S231 to 237 in FIG. 29 and therefore a description thereof is omitted.

As mentioned above, when the electromagnetic wave at the level of the magnetic-flux density TH1 or more for determining the suppression of the output of carrier is not detected, the NFC communication device needs the electromagnetic wave at the level of the magnetic-flux density TH1 for determining the suppression of the output of carrier higher than the magnetic-flux density TH2 or more of the carrier at the operating limit so as to start the output of the electromagnetic wave and normally receive the data. The problem of the hidden terminal is easily solved only by detecting the electromagnetic wave.

That is, the NFC communication device does not need the control logic and memory that are used by the solving method of the problem of the hidden terminal using the commands RTS and CTS and therefore the problem of the hidden terminal is solved with low costs.

Further, the NFC communication device does not need the reception and the transmission of the commands RTS and CTS and therefore the problem of the hidden terminal is fast solved.

In addition, the NFC communication device needs the electromagnetic wave at the level of magnetic-flux density TH2 or more of the carrier at the operating limit, higher than the magnetic-flux density TH1 for determining suppression of output of carrier, so as to normally receive the data. Thus, the distance for receiving and sending the data to/from the communication partner is limited within a predetermined distance. Further, the antenna 11 is used as the coil and the wireless communication path by the transformer combination is established. The distance between the NFC communication devices is longer and thus the attenuation of the electromagnetic wave is increased. The restriction of the distance to the communication partner to normally receive the data is strict (necessarily kept).

When the detecting unit 23 does not detect the electromagnetic wave at the level of the magnetic-flux density TH2 or more of the carrier at the operating limit, the data reception is prevented by prohibiting the data demodulation of the demodulating unit 13. In addition, when the NFC communication device needs the power supply from the communication partner like the conventional IC card, the power necessary for the device operation is obtained by receiving the electromagnetic wave at the level of the magnetic-flux density TH2 or more of the carrier at the operating limit. Thus, the data reception needs the electromagnetic wave at the magnetic-flux density TH2 or more of the carrier at the operating limit.

In the above case, the threshold setting unit 24 sets, as the threshold, the magnetic-flux density TH1 for determining suppression of output of carrier or the magnetic-flux density TH2 of the carrier at the operating limit, and the detecting unit 23 detects the electromagnetic wave at the level of the magnetic-flux density TH1 or more for determining the suppression of the output of carrier and at the level of the magnetic-flux density TH2 or more of the carrier at the operating limit. As described with reference to FIG. 4, the detecting units 23 and 25 individually detect the electromagnetic waves at the levels of the magnetic-flux density TH1 or more for determining the suppression of the output of carrier and of the magnetic-flux density TH2 or more of the carrier at the operating limit. However, it is more advantageous in view of costs to detect, only by the detecting unit 23, the electromagnetic waves at the levels of the magnetic-flux density TH1 or more for determining the suppression of the output of carrier and of the magnetic-flux density TH2 or more of the carrier at the operating limit, as compared with the case of arranging the detecting units 23 and 25.

In the description, the processing steps of the NFC communication device are not in accordance with the sequence described in the flowchart. The parallel or individual processing (e.g., parallel processing or object processing) is included.

According to the embodiments of the present invention, the NFC communication device can receive and send the data by a plurality of transfer rates. Further, according to the present invention, the communication device receives and sends the data only by one transfer rate.

Industrial Applicability

According to the present invention, the problem of the hidden terminal is easily solved.

The invention claimed is:

1. A communication device, comprising:
   means for generating an RF (radio frequency) signal;
   means for modulating the RF signal and for modulating a received RF signal of another device;
   means for demodulating a second RF signal provided to the communication device from the another device; and
   means for detecting the second RF signal of the another device, wherein the means for generating is actuated to initiate an active or a passive mode communication, when the means for detecting does not detect the second RF signal at a level of a first RF field strength threshold or more, the active mode including a transmission of modulated data at the communication device and the another device, the passive mode providing a load modulated communication from the another device to the communication device, and, when the communication device receives an indication to start a communication of the active mode from the another device, the communication device receives data from the another device at a level of a second RF field strength threshold or more, the second RF field strength threshold being higher than the first RF field strength threshold.

2. The communication device in accordance with claim 1, further comprising:
   means for setting the first and second RF field strength thresholds.

3. The communication device in accordance with claim 1, wherein the RF signals are transmitted/received by a coil antenna.

4. The communication device in accordance with claim 1, wherein the first and second RF field strength thresholds are magnetic flux density thresholds.

5. A method of performing a near field communication, comprising:
   generating an RF (radio frequency) signal at a first communication device;
   modulating the RF signal, and modulating a received RF signal of a second communication device, when the RF signal of the second communication device is received;
   demodulating a second RF signal provided to the first communication device from the second communication device; and
   detecting the second RF signal of the second communication device, wherein the generating is actuated to initiate an active or a passive mode communication, when the detecting does not detect the second RF signal at a level of a first RF field strength threshold or more, the active mode including a transmission of modulated data at the first communication device and the second communication device, the passive mode providing a load modulated communication from the second communication device to the first communication device, and, when the first communication device receives an indication to start a communication of the active mode from the second communication device, the first communication device receives data from the second communication device at a level of a second RF field strength threshold or more, the second RF field strength threshold being higher than the first RF field strength threshold.

6. The method in accordance with claim 5, further comprising:
   prohibiting an output of an RF signal, when the detecting detects the second RF signal at the level of the first RF field strength threshold or more.

7. A non-transitory, computer readable storage medium encoded with computer program instructions, which when executed cause the computer to operate as a near field communication device implementing a method comprising:
   generating an RF (radio frequency) signal;
   modulating the RF signal, and modulating a received RF signal of a communication device, when the RF signal of the communication device is received;
   demodulating a second RF signal provided to the computer from the communication device; and
   detecting the second RF signal of the communication device, wherein the generating is actuated to initiate an active or a passive mode communication, when the detecting does not detect the second RF signal at a level of a first RF field strength threshold or more, the active mode including a transmission of modulated data at the computer and the communication device, the passive mode providing load modulated communication from the communication device to the computer, and, when the computer receives an indication to start a communication of the active mode from the communication device, the computer receives data from the communication device at a level of a second RF field strength threshold or more, the second RF field strength threshold being higher than the first RF field strength threshold.

* * * * *